US010565560B2

(12) United States Patent
Zhang et al.

(10) Patent No.: US 10,565,560 B2
(45) Date of Patent: Feb. 18, 2020

(54) ALTERNATIVE PEOPLE CHARTING FOR ORGANIZATIONAL CHARTS

(71) Applicants: Kit Yue Zhang, Sterling, VA (US); David Hsia, So. San Francisco, CA (US); Dominic Philip Haine, So. San Francisco, CA (US)

(72) Inventors: Kit Yue Zhang, Sterling, VA (US); David Hsia, So. San Francisco, CA (US); Dominic Philip Haine, So. San Francisco, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 560 days.

(21) Appl. No.: 14/539,892

(22) Filed: Nov. 12, 2014

(65) Prior Publication Data

US 2016/0132215 A1   May 12, 2016

(51) Int. Cl.
  *G06Q 10/10*  (2012.01)
  *G06F 3/0481*  (2013.01)
  *G06F 3/0482*  (2013.01)

(52) U.S. Cl.
  CPC ......... *G06Q 10/105* (2013.01); *G06F 3/0481* (2013.01); *G06F 3/0482* (2013.01)

(58) Field of Classification Search
  CPC .. G06F 3/04842; G06F 3/0481; G06F 3/0482; G06Q 10/105
  See application file for complete search history.

(56) References Cited

U.S. PATENT DOCUMENTS

| | | | |
|---|---|---|---|
| 6,341,280 B1* | 1/2002 | Glass | G06F 17/30067 707/754 |
| 9,335,901 B1* | 5/2016 | Pantel | G06F 3/0484 |
| 2001/0015733 A1* | 8/2001 | Sklar | G06F 17/30241 715/853 |
| 2002/0130906 A1* | 9/2002 | Miyaki | G01C 21/3664 715/837 |
| 2004/0111431 A1* | 6/2004 | Zeller | G06F 17/30994 |
| 2004/0169688 A1* | 9/2004 | Burdick | G06F 17/30994 715/854 |
| 2005/0114802 A1* | 5/2005 | Beringer | G06F 17/30991 715/700 |
| 2005/0210412 A1* | 9/2005 | Matthews | G06F 9/451 715/835 |
| 2006/0020899 A1* | 1/2006 | Gusmorino | G06F 3/04817 715/765 |

(Continued)

OTHER PUBLICATIONS

Moden, "Displaying Sorted Hierarchies (SQL Spackle)," Mar. 10, 2011, http://www.sqlservercentral.com/articles/T-SQL/72503/.*

(Continued)

*Primary Examiner* — Ryan Barrett
(74) *Attorney, Agent, or Firm* — Fountainhead Law Group P.C.

(57) ABSTRACT

Techniques are described for generating and presenting alternative organizational views for an organizational chart being presented inside a browser window. These different organizational views can organize the contents of the organizational chart based on different dimensions, thus allowing the user to group employees within the organizational chart across different dimensions. Advantages of presenting these different groupings is to allow the managers to quickly check the status of their direct reports.

20 Claims, 14 Drawing Sheets

(56) References Cited

U.S. PATENT DOCUMENTS

| | | | |
|---|---|---|---|
| 2006/0288311 A1* | 12/2006 | Heer | G06T 11/206 |
| | | | 715/853 |
| 2007/0288456 A1* | 12/2007 | Aravamudan | G06F 3/0481 |
| 2008/0091441 A1* | 4/2008 | Flammer | G06Q 10/06 |
| | | | 705/320 |
| 2008/0115082 A1* | 5/2008 | Simmons | G06N 5/02 |
| | | | 715/804 |
| 2009/0055413 A1* | 2/2009 | Audet | G06T 11/206 |
| 2009/0164947 A1* | 6/2009 | Taylor | G06F 17/30572 |
| | | | 715/854 |
| 2009/0187864 A1* | 7/2009 | Bedell | G06F 3/04817 |
| | | | 715/854 |
| 2010/0077355 A1* | 3/2010 | Belinsky | G06F 3/0482 |
| | | | 715/835 |
| 2010/0158097 A1* | 6/2010 | Pascal | G06Q 10/107 |
| | | | 375/240 |
| 2010/0287512 A1* | 11/2010 | Gan | G06F 17/30994 |
| | | | 715/854 |
| 2011/0010650 A1* | 1/2011 | Hess | G06F 3/04817 |
| | | | 715/765 |
| 2011/0041099 A1* | 2/2011 | Weise | G06F 3/0482 |
| | | | 715/854 |
| 2011/0128241 A1* | 6/2011 | Kang | G06F 1/1643 |
| | | | 345/173 |
| 2011/0161875 A1* | 6/2011 | Kankainen | G06F 3/0481 |
| | | | 715/810 |
| 2011/0197138 A1* | 8/2011 | Mahmood | G06Q 10/00 |
| | | | 715/738 |
| 2011/0316884 A1* | 12/2011 | Giambalvo | G06F 3/04815 |
| | | | 345/660 |
| 2012/0017168 A1* | 1/2012 | Mason | G06F 3/04817 |
| | | | 715/781 |
| 2012/0075341 A1* | 3/2012 | Sandberg | G06F 3/147 |
| | | | 345/633 |
| 2012/0311496 A1* | 12/2012 | Cao | G06F 17/30601 |
| | | | 715/821 |
| 2012/0324357 A1* | 12/2012 | Viegers | G06F 3/0481 |
| | | | 715/730 |
| 2013/0063278 A1* | 3/2013 | Prosser | G01F 23/74 |
| | | | 340/870.02 |
| 2013/0104046 A1* | 4/2013 | Casco-Arias Sanchez | |
| | | | G06F 21/604 |
| | | | 715/736 |
| 2013/0151275 A1* | 6/2013 | Thiers | G06Q 50/22 |
| | | | 705/2 |
| 2014/0059412 A1* | 2/2014 | Folting | G06F 17/30489 |
| | | | 715/212 |
| 2014/0129493 A1* | 5/2014 | Leopold | G06F 17/30554 |
| | | | 706/12 |
| 2014/0204119 A1* | 7/2014 | Malamud | G06T 19/006 |
| | | | 345/633 |
| 2014/0236849 A1* | 8/2014 | Flammer | G06Q 10/06 |
| | | | 705/320 |
| 2014/0279628 A1* | 9/2014 | Straznitskas | G06Q 10/105 |
| | | | 705/320 |
| 2015/0378526 A1* | 12/2015 | Ramanathan | G06F 17/30554 |
| | | | 715/841 |
| 2015/0378555 A1* | 12/2015 | Ramanathan | G06F 3/04817 |
| | | | 715/765 |
| 2015/0378556 A1* | 12/2015 | Ramanathan | G06F 3/04817 |
| | | | 715/765 |
| 2016/0021153 A1* | 1/2016 | Hull | H04L 65/403 |
| | | | 715/753 |
| 2016/0054894 A1* | 2/2016 | Zhang | G06F 3/04842 |
| | | | 715/811 |
| 2016/0098668 A1* | 4/2016 | Hojby | G06Q 10/067 |
| | | | 705/7.17 |

OTHER PUBLICATIONS

Burigat et al., "Decluttering of Icons based on Aggregation in Mobile Maps," Mar. 2008, http://hcilab.uniud.it/publications/414.html.*

* cited by examiner

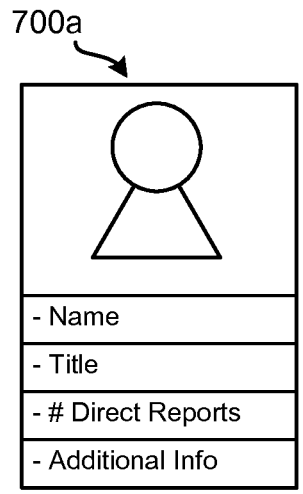
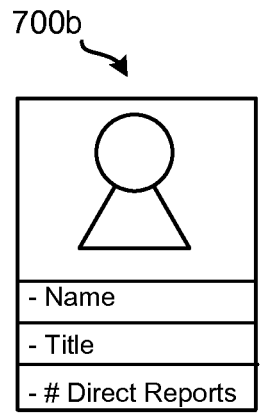
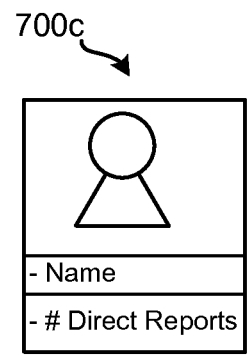
FIG. 7a     FIG. 7b     FIG. 7c
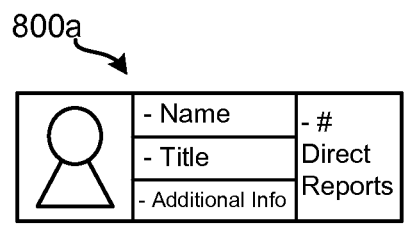
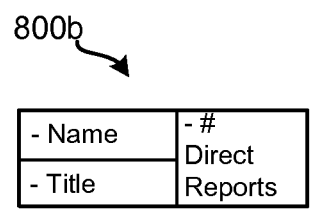
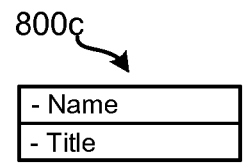
FIG. 8a     FIG. 8b     FIG. 8c

ALTERNATIVE PEOPLE CHARTING FOR ORGANIZATIONAL CHARTS

BACKGROUND

An organizational chart is a diagram that graphically shows the structure of an organization and the relationships and ranks of members (or groups) within the organization. The organizational chart can be useful in helping members within the organization visualize who is in the organization and the relationships between different members. Exemplary relations include manager-employee, director to managing directors, and others. Typically, the organizational chart is presented within a window, such as a browser window.

For small business organizations, the entire organization can be presented within an organizational chart in the browser window with ease. However as organizations grow, it becomes difficult to display all the members simultaneously within the browser window. For example, a director can have multiple managers who directly report to the director. Each manager can also include many employees who directly report to the manager. Seeing the relationship between two employees can become difficult given the number of people being displayed can require scrolling around the browser window. This can be very time consuming and confusing.

SUMMARY

In one embodiment, a computer-implemented method presents, by a processor, a filter menu within a window of a graphical user interface, the filter menu containing a plurality of dimensions associated with employees within an organizational chart. The method then detects, by the processor, a first user input on the graphical user interface that is representative of selecting a first dimension from the plurality of dimensions. Finally, the method presents, by the processor, a first organizational view configured to group employees within the organizational chart based on the selected first dimension.

In one example, the first organizational view is further configured as a data table divided into a plurality of sections, wherein a section of the plurality of sections is associated with a value for the selected first dimension and is configured to present a group of employees within the organizational chart having the value for the selected first dimension. The group of employees within the organization can be presented as a plurality of clusters, wherein a cluster from the plurality of clusters contains at least one employee from the group of employees that reside within a hierarchical level of the organizational chart.

In another example, the method further comprises detecting, by the processor, a second user input on the graphical user interface that is representative of selecting a second dimension from the plurality of dimensions and replacing, by the processor, the first organizational view with a second organizational view configured to group employees within the organizational chart based on the selected first dimension and the selected second dimension. The second organizational view can be configured as a matrix table divided into a plurality of sections, wherein a section of the plurality of sections is associated with a first value for the selected first dimension and a second value for the selected second dimension and is configured to present a group of employees within the organizational chart having the first value for the selected first dimension and the second value for the selected second dimension.

In another example, the first organization view is a geographical map, the selected first dimension is a location dimension and employees within the organization chart that share a location for the location dimension are grouped together and represented using a single tile. The method can further comprise detecting, by the processor, a second user input on the graphical user interface that is representative of zooming into the geographical map and presenting, by the processor, a plurality of tiles adjacent to the single tile, wherein each tile in the plurality of tiles represents an employee within the organizational chart that share the location.

In another embodiment, a non-transitory computer readable storage medium stores one or more programs comprising instructions for presenting a filter menu within a window of a graphical user interface, the filter menu containing a plurality of dimensions associated with employees within an organizational chart, detecting a first user input on the graphical user interface that is representative of selecting a first dimension from the plurality of dimensions and presenting a first organizational view configured to group employees within the organizational chart based on the selected first dimension.

In another embodiment, a computer implemented system comprises one or more computer processors and a non-transitory computer-readable storage medium. The non-transitory computer-readable storage medium comprises instructions, that when executed, control the one or more computer processors to be configured for presenting a filter menu within a window of a graphical user interface, the filter menu containing a plurality of dimensions associated with employees within an organizational chart, detecting a first user input on the graphical user interface that is representative of selecting a first dimension from the plurality of dimensions, and presenting a first organizational view configured to group employees within the organizational chart based on the selected first dimension.

The following detailed description and accompanying drawings provide a better understanding of the nature and advantages of the present disclosure.

BRIEF DESCRIPTION OF THE DRAWINGS

FIGS. 7a, 7b, and 7c illustrate exemplary tile templates according to one embodiment;

FIGS. 8a, 8b, and 8c illustrate exemplary tile templates according to one embodiment;

DETAILED DESCRIPTION

Figure 1:
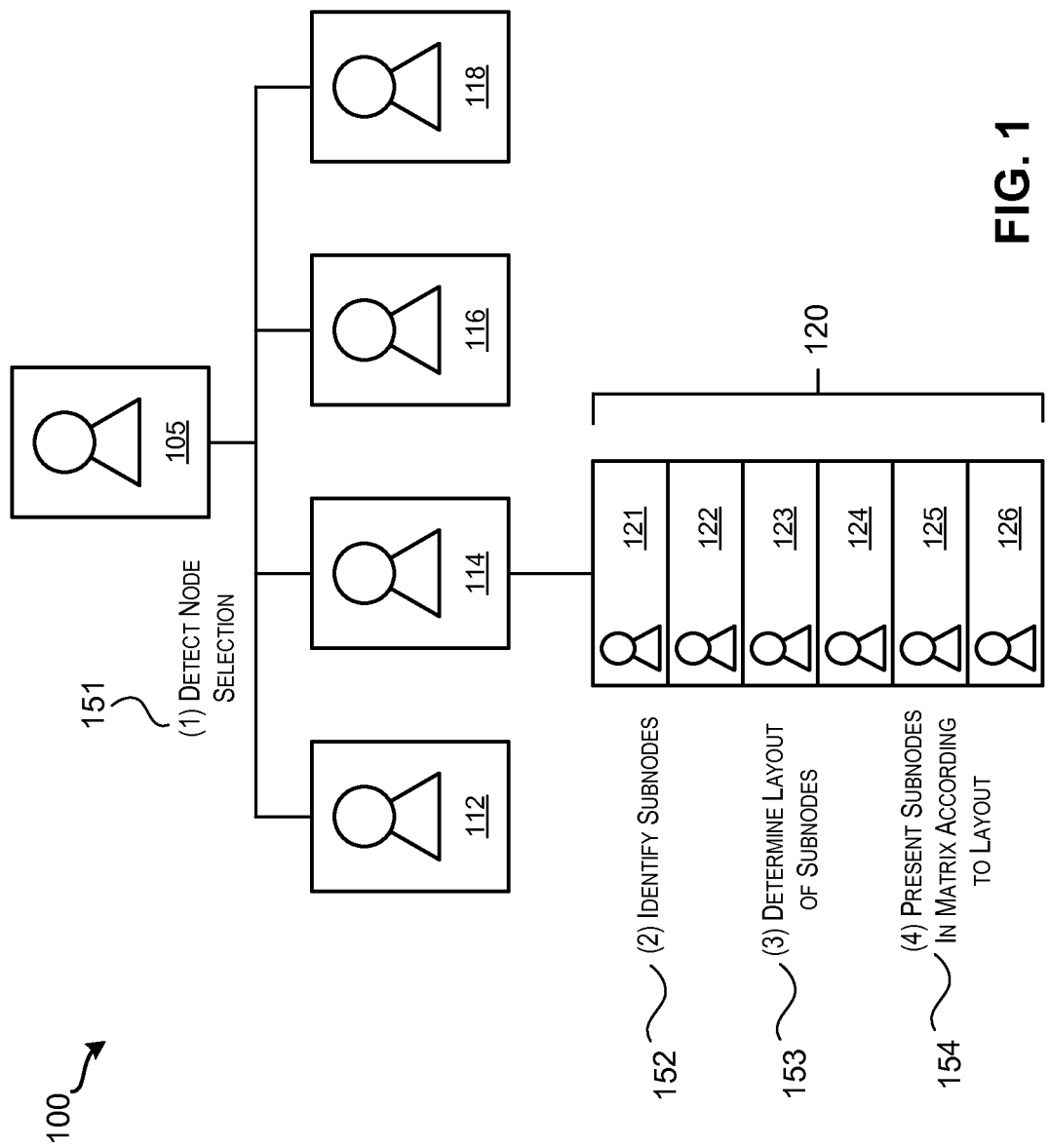
FIG. 1 illustrates a workflow for presenting a first selected node in an organizational chart according to one embodiment.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Described herein are techniques for dynamically updating the layout of an organizational chart to better utilize the viewable area within window. The window can be a browser window. An organization is typically organized hierarchically, where the highest ranking people are at the apex and the lowest ranking people are at the bottom, thus appearing like a pyramid. The base of the pyramid are members of the organization that do not have any subordinates. In some embodiments, one level of the hierarchy is initially displayed in the browser window. For example, a person of interest can be presented on the apex and the direct reports of the person of interest are presented in a horizontal row below the person of interest. Employees presented in the same row typically appear in the same level of the hierarchical organization. Selecting a direct report can cause the system to present the direct reports of the selected direct report in the organizational chart.

In one embodiment, the system can dynamically alter the layout in which the direct reports are presented according to the number of direct reports that need to be presented. For example, a vertical vector can be used to present the direct reports when the number of direct reports is under a predefined threshold. This can reduce horizontal scrolling to view all the direct reports, thereby improving the visibility of the organizational chart. Alternatively, a two-dimensional matrix can be used to present the direct reports when the number of direct reports is equal to or over the predefined threshold. Viewing a large numbers of direct reports may be easier in a two-dimensional matrix rather than a one-dimensional matrix (e.g., vertical vector) since it reduces vertical scrolling. In other embodiments, the system can dynamically alter the layout based on the number of direct reports to present and the available space in the browser window. For example, the dimensions of the matrix can be selected to maximize the number of direct reports that can be simultaneously presented in the viewable area of the browser window along with the person of interest that is managing the direct reports. In yet other embodiments, selecting multiple nodes in the organizational chart or resizing the browser window can result in the layout of the organizational chart to be dynamically altered.

The system can be implemented on the client side or server side. For example, the system can be implemented on the client device and be configured to update the organizational chart according to user input received on the client device. As another example, the system can be implemented on a server that is in communication with a client device. User input received on the client device can be transmitted from the client device to the server. The server can process the detected user input and update the organizational chart. Once updated, the server can transmit the updated organizational chart or the necessary changes to update the existing organizational to the client device. The client device can present the content received to the user.

FIG. 1 illustrates a workflow for presenting a first selected node in an organizational chart according to one embodiment. Organizational chart 100 is being presented in a window of a graphical user interface. Organizational chart 100 can be generated based on an underlying hierarchical organization. The hierarchical organization is a structure that describes people (or other entities) within the organization as a subordinate or manager. Each person can be represented as a node within the hierarchical organization. Nodes can connect with one another to represent relationships between people. For example, a node representing a manager can be directly connected to a subnode representing a direct report. The placement of the subnode representing the direct report can appear below the node representing the manager. Organizational chart 100 is a visual representation of a view of the hierarchical organization. The view can present a portion of the hierarchical organization with respect to a person of interest. One or more nodes of the hierarchical organization can be presented in the organizational chart. As shown, this view is based on the relationships with a manager in the hierarchical organization that is being represented by node 105. For this reason, node 105 appears at the apex of organizational chart 100. Under node 105, organizational chart 100 includes nodes 112, 114, 116, and 118. These nodes represent the direct reports of the manager. Since nodes 112, 114, 116, and 118 have the same ranking with respect to the manager being represented by node 105, these nodes are appear along the same horizontal plane below node 105. In some embodiments, a node can be visually presented in organizational chart 100 as a tile. The tile can include attributes corresponding to the person that is being represented by the node. For example, the tile can include the person's profile image, name, role/title in the organization, number of direct reports, number of total reports, and other attributes that are related to the person.

The workflow begins at step (1) (reference numeral 151) with the system (which can be a computer system that includes a processor and non-transitory memory) detecting user input on the graphical user interface that is representative of selecting node 114. Node 114 represents an employee and selection of node 114 can be interpreted as an interest to display the direct reports of the employee. Once node 114 has been selected, the workflow continues by identifying the subnodes (e.g., direct reports) of node 114 at step (2) (reference numeral 152). This can be completed by querying the hierarchical organization for the direct reports of node 114. This can be the subnodes that are directly connected to node 114. Once the subnodes have been identified, the workflow can continue by determining a layout to apply to the subnodes at step (3) (reference numeral 153). The layout can be selected from one or more predefined layouts that are applicable to the subnodes. The applicability of a predefined layout to the subnodes can be determined by the number of subnodes that exist. For example, there may be three applicable layouts (4×1, 2×2, and 1×4) that are applicable when there are four subnodes available. Here, the workflow can determine that the layout to apply to the subnodes is a vertical vector since the number of subnodes is below a predefined threshold. Once the layout has been determined, the workflow can continue by presenting the subnodes in a matrix according to the layout at step (4) (reference numeral 154). Here, the layout for matrix 120 is a vertical vector and as a result, subnodes 121-126 are presented in matrix 120 as a vertical vector. Matrix 120 can disappear from organizational chart 100 when user input representative of selecting node 114 a second time is detected. Selecting a node a first time can cause the subnodes of the selected node to appear in organizational chart 100 while selecting the node a second time can cause the subnodes of the selected node to disappear from organizational chart 100.

In some embodiments, more than one node (or subnode) can be selected in the organizational chart. The ability to select multiple nodes (or subnodes) in the organizational chart provides freedom to a user when exploring the hierarchical organization. For example, the direct reports of a first manager can be viewed simultaneously with the direct reports of a second manager. This allows the subordinates of different managers to be compared with one another. As another example, the direct reports of an upper level manager can be viewed simultaneously with the direct reports of a lower level manager where the lower level manager reports to the upper level manager. As a result, multiple levels of hierarchy can be explored at the same time.

Figure 2:
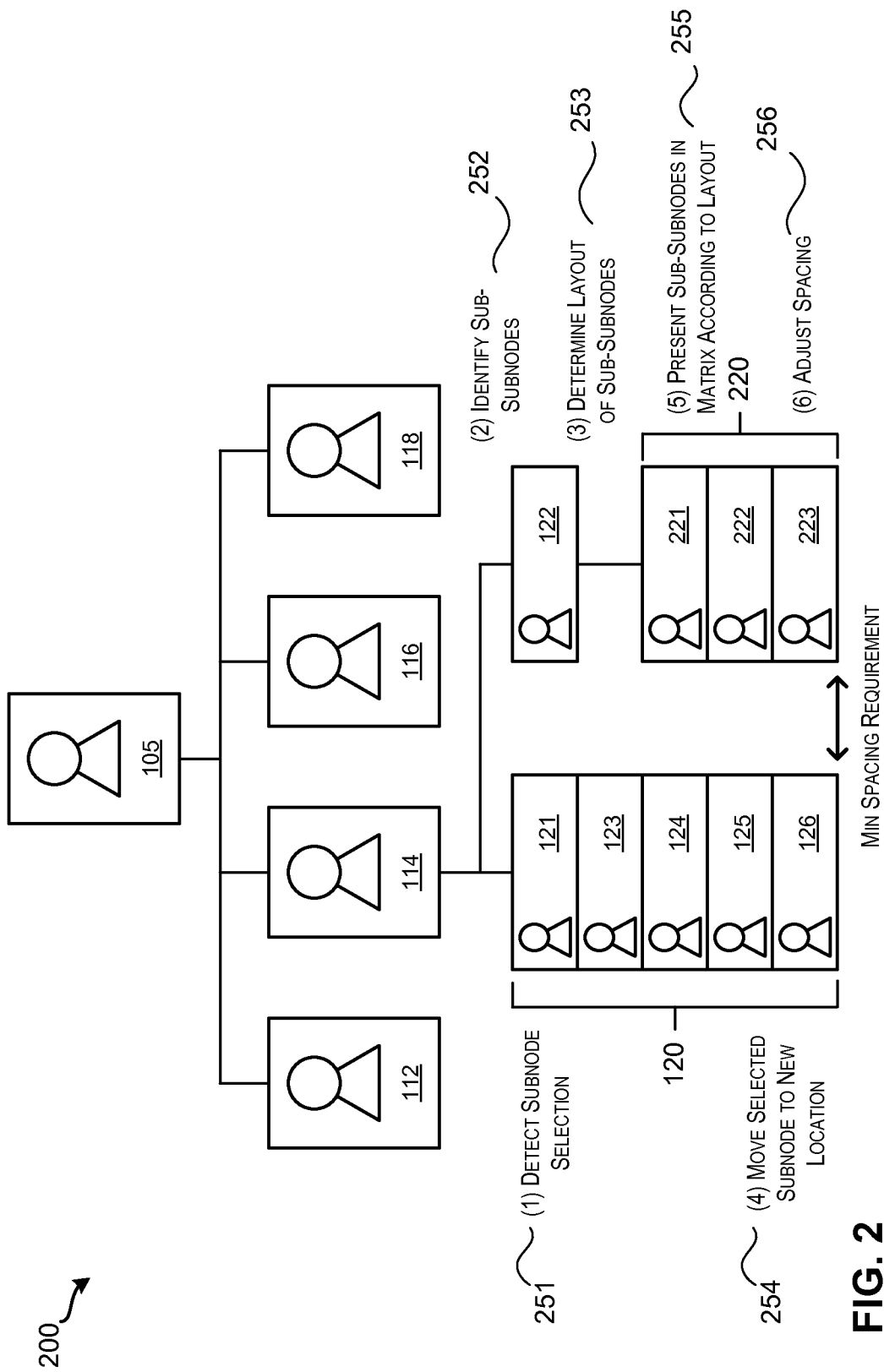
FIG. 2 illustrates a workflow for presenting a second selected node in an organizational chart according to one embodiment.

FIG. 2 illustrates a workflow for presenting a second selected node in an organizational chart according to one embodiment. Organizational chart 200 can be presented in response to the selection of subnode 122 in organizational chart 100 of FIG. 1. The workflow can begin by detecting user input representative of selecting subnode 122 at step (1) (reference numeral 251). When the selection of subnode 122 is detected, workflow 200 can continue by identifying the sub-subnodes of subnode 122 at step (2) (reference numeral 252). The sub-subnodes represent the direct reports of the employee represented by subnode 122. Identifying the sub-subnodes can include querying the hierarchical organization for the direct reports of subnode 122. Once the sub-subnodes have been identified, the workflow can continue by determining a layout for the sub-subnodes at step (3) (reference numeral 253). In one embodiment, the layout of the sub-subnodes can be determined based on the number of sub-subnodes that exist for subnode 122. For example if the number of sub-subnodes is below a predefined threshold (e.g., 15), then the layout can be a vertical vector. Alternatively if the number of sub-subnodes is above or equal to the predefined threshold, then the layout can be a multi-dimensional matrix. Here, the layout would be a vertical vector since there are three sub-subnodes, which is under the predefined threshold of 15.

Once the layout has been determined, the workflow can proceed by moving the selected subnode (subnode 122) from matrix 120 to a new location in organizational chart 200 at step (4) (reference numeral 254). In one embodiment, the new location can be in the same horizontal plane as matrix 120 to signify that subnode 122 and the subnodes within matrix 120 reside in the same hierarchical level within the hierarchical organization. The new location can be to the left or the right of matrix 120. In one example, the workflow can move subnode 122 to the side of matrix 120 that has more room in organizational chart 200. In another example, the workflow can move subnode 122 to the side of matrix 120 that is more centered in organizational chart 200.

Once subnode 122 has been moved to its new location, the workflow continues by presenting sub-subnodes in matrix 220 according to the determined layout at step (5) (reference numeral 255). Here, sub-subnodes 221, 222, and 223 are presented within matrix 220 in a vertical vector format. Once matrix 220 has been presented, the workflow can optionally adjust the spacing between nodes, subnodes, and sub-subnodes to ensure that minimum spacing requirements are satisfied at step (6) (reference numeral 256). Minimum spacing requirements can specify the amount of space that should exist between elements (nodes, subnodes, matrixes, etc.) within organizational chart 200. For example if the spacing between matrix 120 and matrix 220 violated the minimum spacing requirements, matrix 220 can be moved away from matrix 120 until the minimum spacing requirement is satisfied. This movement can also cause connected nodes (subnodes, etc.) of matrix 220 to also move. For example subnode 122 can also move in the same direction by the same distance as matrix 220 to satisfy the minimum spacing requirement. In some examples, the movement of one element can cause a chain reaction of violations of other spacing requirements. Thus, the workflow can recursively adjust the spacing between elements of organizational chart 200 until all minimum spacing requirements are satisfied.

Figure 3:
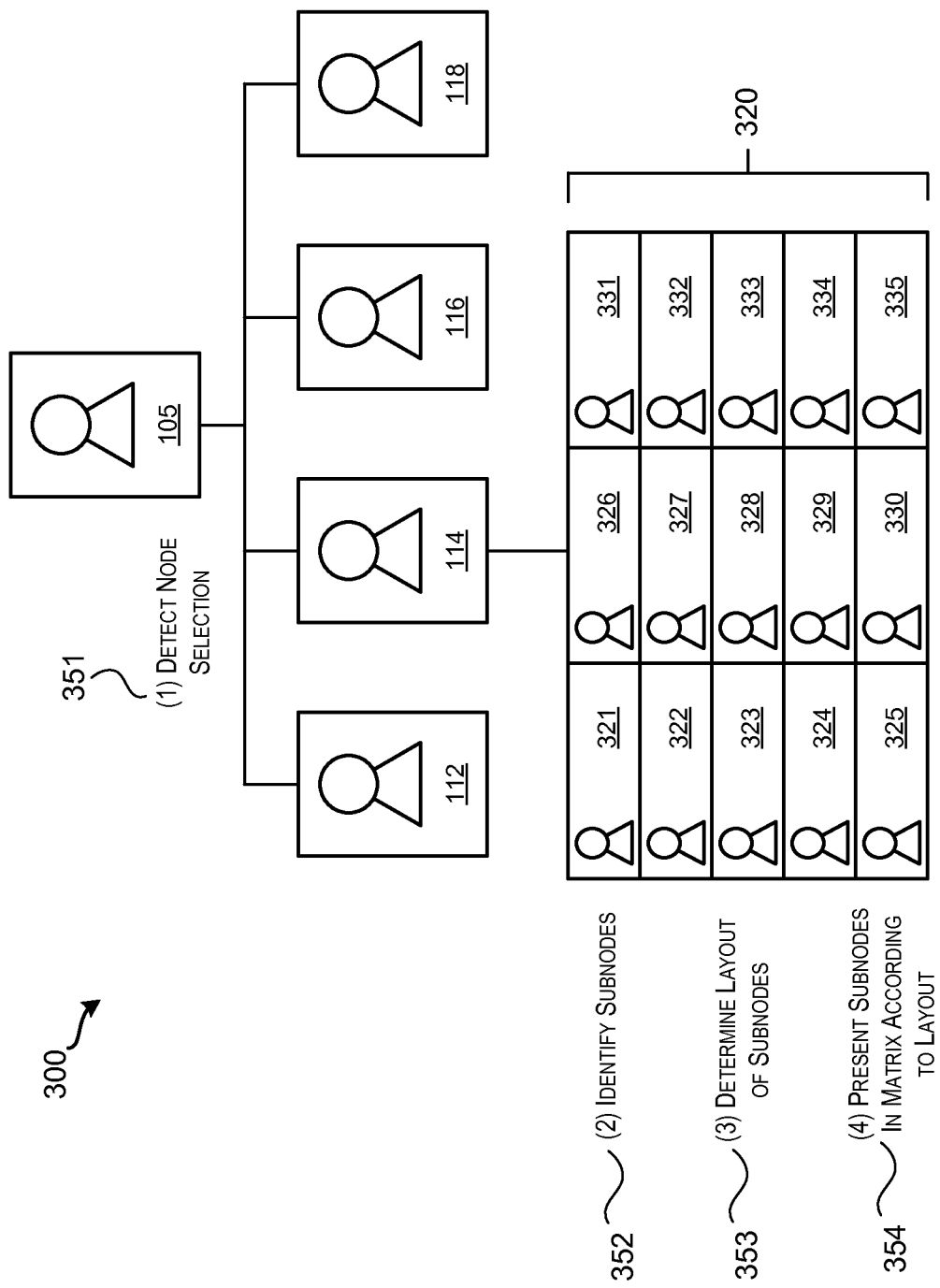
FIG. 3 illustrates another workflow for presenting a selected node in an organizational chart according to one embodiment.

FIG. 3 illustrates another workflow for presenting a selected node in an organizational chart according to one embodiment. Similar to organizational chart 100 of FIG. 1, organizational chart 300 includes node 105 and the direct reports of node 105, which are nodes 112, 114, 116, and 118. The workflow begins at step (1) (reference numeral 351) with the system detecting user input on the graphical user interface that is representative of selecting node 114. Node 114 represents an employee and selection of node 114 can be interpreted as an interest to display the direct reports of the employee. Once node 114 has been selected, the workflow reports of node 114. This can be the subnodes that are directly connected to node 114. Once continues by identifying the subnodes (e.g., direct reports) of node 114 at step (2) (reference numeral 352). This can be completed by querying the hierarchical organization for the direct the subnodes have been identified, the workflow can continue by determining a layout to apply to the subnodes at step (3) (reference numeral 353). The layout can be selected from one or more predefined layouts that are applicable to the subnodes. The applicability of a predefined layout to the subnodes can be determined by the number of subnodes that exist. In one embodiment, the workflow can attempt to avoid the presence of an empty element in matrix 320 by selecting a layout that fits the subnodes. For example if there are 15 subnodes, then the layouts which may be applicable are 15×1, 3×5, 5×3, and 1×15. Layouts containing 8×2 or 2×8 may not be preferred since populating 15 subnodes into a 8×2 matrix would result in an empty element in the matrix. Here, the workflow can determine that the layout to apply to the subnodes is a two dimensional matrix since the number of subnodes is equal to or above a predefined threshold (threshold is 15). Of the two dimensional matrixes, a 5×3 and 3×5 may be recommended and one of the two can be selected. In one example, the preferred layout can have more rows than columns (e.g., 5×3) since it would reduce horizontal scrolling in organizational chart 300.

Once the layout has been determined, the workflow can continue by presenting the subnodes in a matrix according to the layout at step (4) (reference numeral 354). Here, the layout for matrix 320 is a 5×3 matrix. The subnodes of node 114 (e.g., subnodes 321-335) are presented in matrix 320 according to the layout. Each subnode can be presented as a tile where attributes of the employee corresponding to the subnode can be displayed in the tile. In some embodiments, the tiles used to present the subnodes in a matrix can be different than the tiles used to present nodes in the organizational chart 300. For example, the tiles used to represent nodes in the organizational chart can be larger in size. As a result, the type font can be larger in size or additional information can be presented in the tiles that represent the nodes. Matrix 320 can disappear from organizational chart 100 when user input representative of selecting node 114 a second time is detected. Selecting a node a first time can cause the subnodes of the selected node to appear in organizational chart 300 while selecting the node a second time can cause the subnodes of the selected node to disappear from organizational chart 300.

Figure 4:
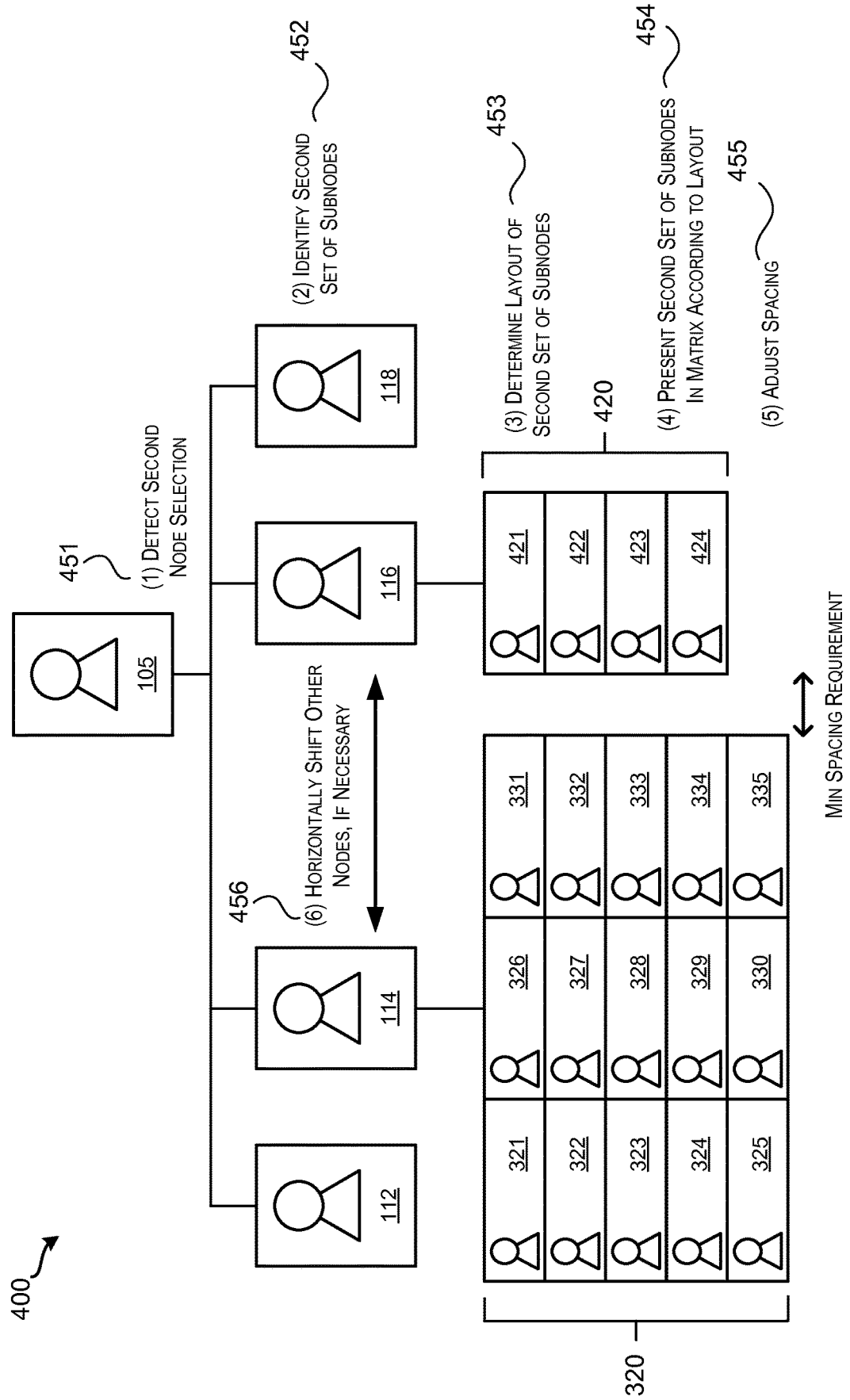
FIG. 4 another illustrates a workflow for presenting a second selected node in an organizational chart according to one embodiment.

FIG. 4 another illustrates a workflow for presenting a second selected node in an organizational chart according to one embodiment. Organizational chart 400 can be presented in response to the selection of node 116 in organizational chart 300 of FIG. 3. As shown here, the second node detected resides in the same horizontal layer as an earlier selected node (node 114). Here, the workflow begins by detecting a second node being selected at step (1) (reference numeral 451). Selection of the second node can be understood as an interest to present the direct reports of the second node in organizational chart 400. Once the second node has been selected, the workflow continues by identifying a second set of subnodes at step (2) (reference numeral 452). The subnodes can represent the direct reports of the employee that corresponds with node 116. Here, subnodes 421-424 represent the direct reports of node 116. After the second set of subnodes are identified, the workflow continues by determining the layout for the second set of subnodes at step (3) (reference numeral 453). The layout for the second set of subnodes can be determined using the same approach as determining the layout for the first set of subnodes (the subnodes of matrix 320). Here, the layout for the second set of subnodes is a vertical vector when the number of subnodes is below a predefined threshold of 15. Alternatively if the number of subnodes is greater than or equal to the predefined threshold of 15, a two dimensional matrix is used as the layout.

Once the layout has been determined, the workflow continues by presenting the second set of subnodes in a matrix according to the layout. Here, the matrix is based on the layout of a vertical vector and as a result, subnodes 421-424 are presented in matrix 420 as a vertical vector. In some embodiments, the workflow can adjust for minimum spacing requirements at step (5) (reference numeral 455). While adjusting for the minimum spacing requirement, the workflow may horizontally shift other nodes (particularly parent nodes of the second set of subnodes) so that the parent nodes of the subnodes appear above the matrix at step (6) (reference numeral 456). In one embodiment, the workflow can check for and adjust the spacing within the organizational chart to ensure that the minimum spacing requirements are satisfied before presenting matrix 420. In another embodiment, the workflow can initially present matrix 420 in organizational chart 400 and then incrementally move the nodes, subnodes, and matrixes in organizational chart 400 until the minimum spacing requirements are satisfied. The movement can be animated. For example, the workflow can present matrix 320 slowly shifting horizontally away from matrix 420 until the minimum spacing requirement is satisfied. While matrix 320 is shifting, node 114 can also shift along with matrix 320. Shifting node 114 can also cause node 112 to shift along with node 114 to ensure that the minimum spacing requirement between node 112 and 114 is not violated.

Figure 5:
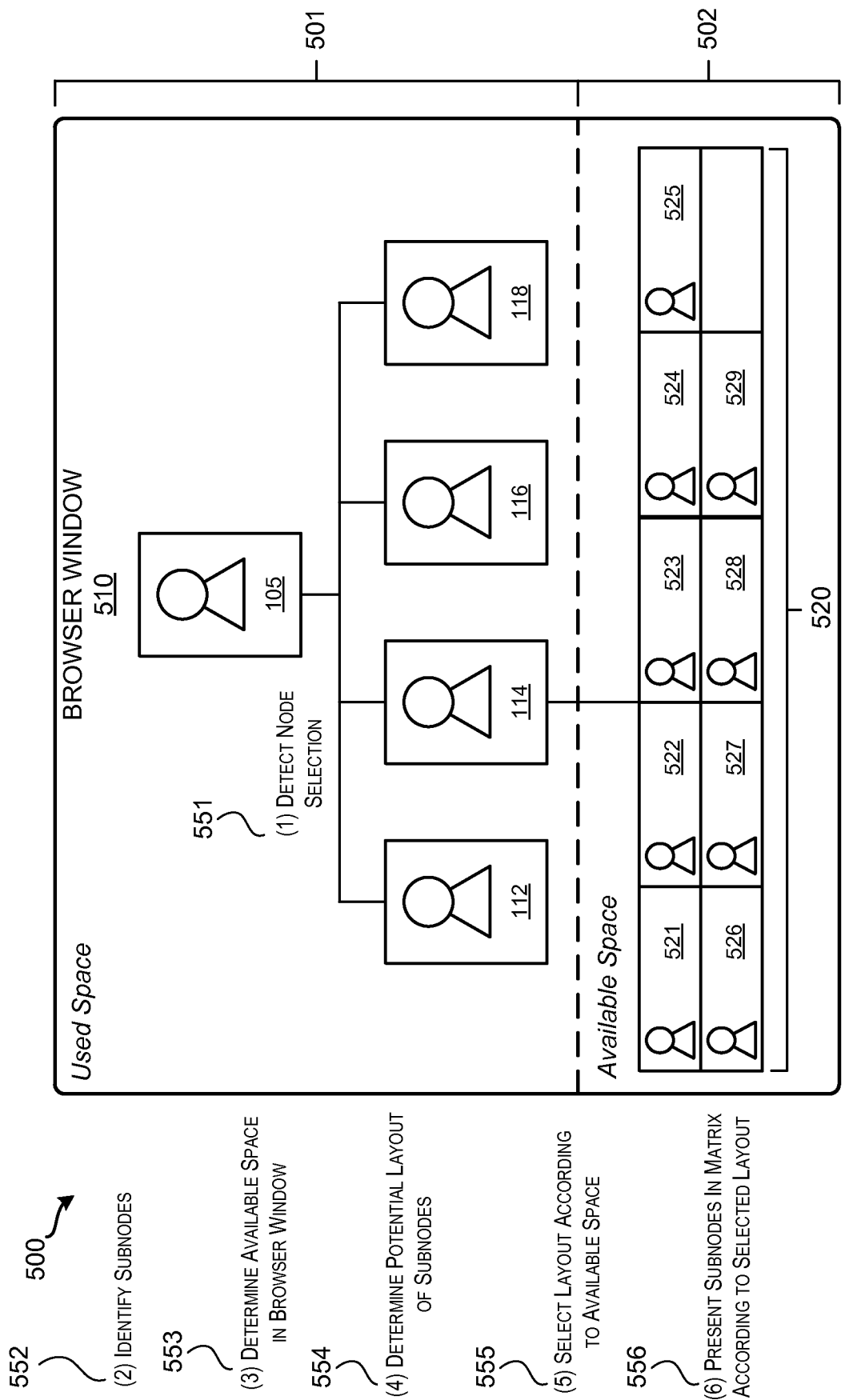
FIG. 5 illustrates another workflow for presenting a selected node in an organizational chart according to one embodiment.

As described above, the system can adjust the layout of the matrix based on the number of subnodes that are to be presented. In some embodiments, the system can alternatively adjust the layout of the matrix to be presented in the organizational chart based on the space available in the browser window. FIG. 5 illustrates another workflow for presenting a selected node in an organizational chart according to one embodiment. As shown here, organizational chart 500 is presented within browser window 510. Organizational chart 500 includes nodes 105, 112, 114, 116, and 118. These nodes occupy portion 501 of browser window 510, also known as the used space of browser window 510. Browser window 510 also includes portion 502 which is the available space of browser window 510. The available space is the parts of browser window 510 that are available for the presentation of a matrix. The system can dynamically adjust the layout of a matrix based on the available space. In some examples, the available space can specify an area of browser window 510, as measured in pixels.

Here, the workflow can begin by detecting user input representative of selecting node 114 of organizational chart 500 at step (1) (reference numeral 551). The workflow can then continue by identifying the subnodes of the selected node at step (2) (reference numeral 552). The subnodes can be identified by querying a hierarchical organization for the direct reports of the employee being represented by node 114. Once the subnodes have been identified, the workflow can continue by determining the available space in browser window 510 at step (3) (reference numeral 553). The available space is the portion of the usable space in browser window 510 that is available to the system to add to organizational chart 500. In some examples where browser window 510 allows for scrolling, the usable space within browser window 510 can extend past the viewable space of browser 510. For instance, the usable space in browser window 510 can be 120% of the viewable space in browser window if browser window 510 is configured to allow for 20% scrolling.

The available space in browser window 510 can be calculated using various methods. In one embodiment, the system can determine the available space by identifying the portion of the usable space in browser window 510 that resides below the selected node (node 114). Here, browser window 510 does not allow for scrolling so portion 502 represents the area of browser window 510 that resides below selected node 114. If subnodes or matrixes of organizational chart 500 already exist in portion 502, then the available space would be the part of portion 502 that is currently not being utilized by organizational chart 500. In another embodiment, the system can determine the available space by first calculating the used space within browser window 510. Calculation of the used space can be performed by measuring the portion of browser window 510 that is currently be utilized to present organizational chart 500 when node 114 is selected. Here, portion 501 has been measured as the part of browser window 510 that is being utilized to present organizational chart 500 when the selection of node 114 is detected. The system can subtract portion 501 from the usable space of browser window 510 to determine the available space. As shown here, the available space is portion 502. In some examples, the available space and the used space can take into consideration in screen resolution. Thus, calculation of the used space and the available space can be measured in pixels. By knowing how the dimensions of the available space in pixels, the system can determine the number and orientation of tiles that can fit within the available space. This is by knowing the default size of each tile that is used to represent a subnode.

Once the available space has been determined, the workflow continues by determining the potential layout for the subnodes at step (4) (reference numeral 554). The potential layout can depend on the number of subnodes to present. For example, the system can determine that there are multiple layouts to present the nine subnodes. The potential layouts can include a 2×5 matrix, a 5×2 matrix, and a 3×3 matrix. In one embodiment, the system may provide potential layouts which minimize the occurrence of empty elements in the layout. Here, the 2×5 matrix can store 10 elements. Given that there are only nine subnodes, one element in the matrix will remain empty. Similarly, the 5×2 matrix will have one empty element. The 3×3 element will have zero empty elements. A 4×3 matrix can be determined to not be a potential layout since the layout would result in two empty elements. In some examples, a variable on the system can be configured to specify the maximum number of empty elements in the layout.

At step (5) (reference numeral 555), the workflow can select a layout from the potential layouts according to the available space. In one embodiment, a potential layout without empty elements can be preferred. Here, the system may determine that while a 3×3 layout is preferred when there are nine subnodes, three rows cannot fit within the available space. This determination can be made based on the dimensions of a tile used to represent a subnode and the dimensions of the available space. As a result, other layouts are considered. The system can determine that the available space allows for at most a matrix containing two rows. As a result, the system can select a 2×5 layout based on the available space in browser window 510 over a 5×2 layout or a 3×3 layout. Once the layout has been selected, the workflow continues by presenting the subnodes in matrix 520 according to the selected layout at step (6) (reference numeral 556). As shown here, subnodes 521-529 are being presented in matrix 520 in a multi-dimensional matrix where the layout of the matrix is determined based on the available space.

Figure 6:
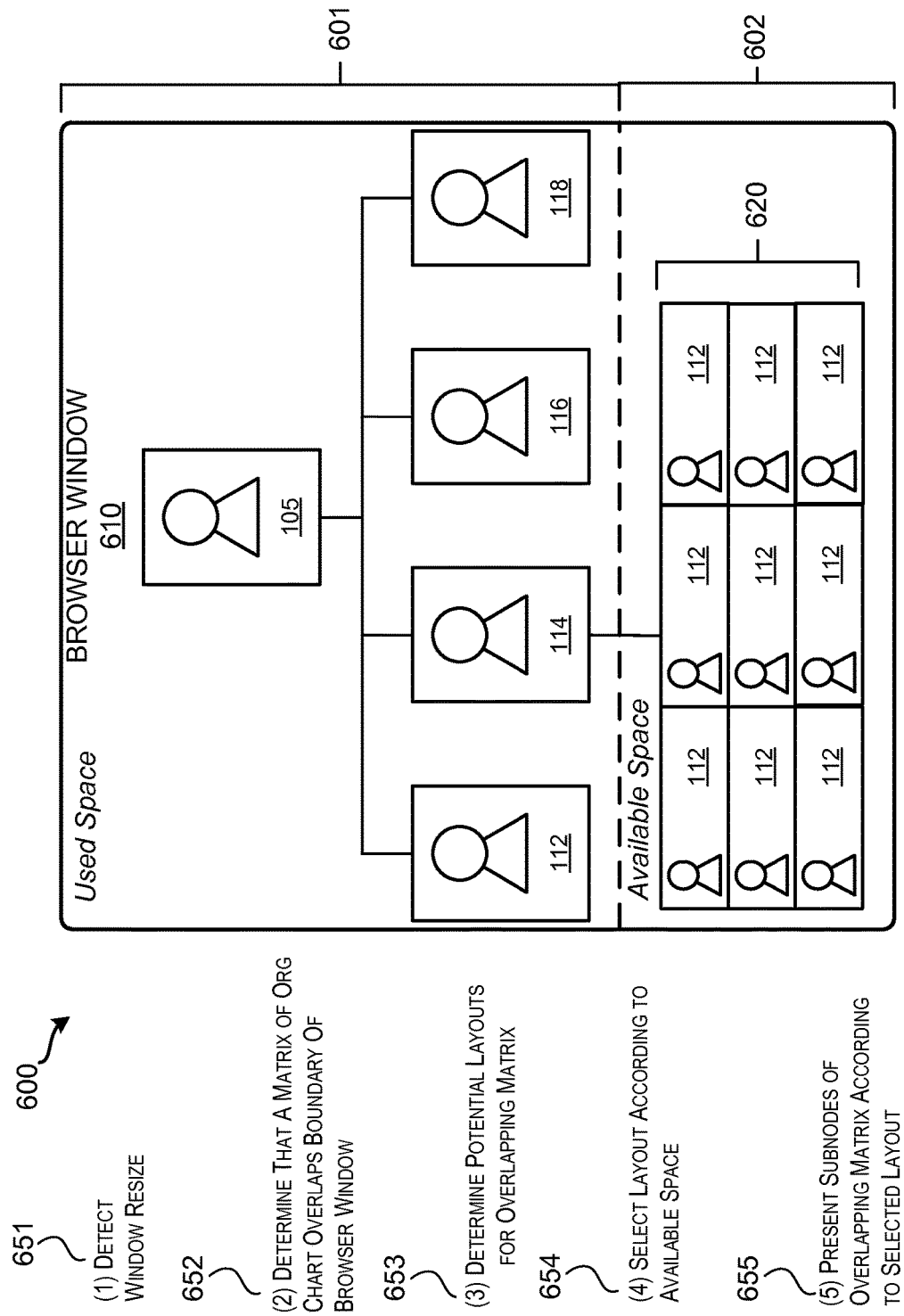
FIG. 6 illustrates a workflow for altering an organizational chart in response to a window resize according to one embodiment.

In some instances, user input can be received to resize the browser window. Resizing the browser window can alter the dimensions of the browser window. As a result, the organizational chart which use to fit within the useable space of the browser window may no longer fit. In these scenarios, the system may adjust the organizational chart to fit within the browser window. FIG. 6 illustrates a workflow for altering an organizational chart in response to a window resize according to one embodiment. Organizational chart 600 includes node 105, 112, 114, 116, and 118. In its initial state, organizational chart 600 can appear similar or substantially similar to organizational chart 500 of FIG. 5. Node 114 can be connected to matrix 520 which contains subnodes. Organizational chart 500 can transition to organizational chart 600 in response to a resize of the browser window from browser window 510 to browser window 610.

At step (1) (reference numeral 651), the workflow can detect user input representative of resizing browser window 610. In one example, the user input can be a click and drag gesture performed by a mouse or other peripheral device. In another example, the user input can be a touch gesture performed on a touch screen display. Once the window resize has been detected, the workflow can continue by determining that a matrix (or other element) of organizational chart 500 overlaps the boundary of usable area of resized browser window 610 at step (2) (reference numeral 652). During resizing, the usable area of browser window 610 can change dimensions. As a result, elements of organizational chart 500 which previously resided within the usable area of browser window 610 now reside wholly or partially outside the usable area of browser window 610. These elements of organizational chart 500 are known as overlapping elements of organizational chart 500. In this example, matrix 520 is an overlapping element since it is partially outside the usable area of browser window 610.

At step (3) (reference numeral 653), the workflow determines the potential layouts that are available for the overlapping matrix. For example, matrix 520 is a 2×5 matrix but other potential matrixes are a 5×2 matrix and a 3×3 matrix. Once the other potentially matrixes have been identified, the workflow continues by select a layout according to the available space in resized browser window 610 at step (4) reference numeral. Here, the available space is portion 602 of browser window 610. Out of the potential layouts (e.g., 2×5, 5×2, and 3×3), the system determines that layout 3×3 would allow the overlapping matrix to fit within the available area of resized browser window 610. As a result, the workflow presents the subnodes of matrix 520 in a 3×3 table, thus resulting in matrix 620. As shown here, matrix 620 now fits within the available space of browser window 610. In some examples, modifying a matrix may cause the modified matrix to collide with other elements in organizational chart 600. As a result, organizational chart 600 can iteratively be modified until all elements of organizational chart 600 fit within browser window 610.

In some instances, the available space within browser window 510 may be insufficient to present any of the potential layouts of matrix 620. This can be due to the fact that there are too many subnodes to present in the available space. Alternatively, this can be due to the fact that the resized browser window is leaves not enough available space to present matrix 620. In one embodiment, the system can recognize this condition and automatically close matrix 620, thus making it appear as though node 144 has not been selected. In another embodiment, the system can recognize this condition and automatically scale organizational chart 600 such that organizational chart 600 fits within browser window 610. Resizing organizational chart 600 can cause the tiles of organizational chart 600 to shrink in size and thus occupy fewer pixels. The smaller sized tiles can present fewer attributes than the larger tiles.

FIGS. 7a, 7b, and 7c illustrate exemplary tile templates according to one embodiment. Each tile template is associated with a different sized tile which can be used to represent a node or subnode in the organizational chart. The system may select a tile template based on the scale of the organizational chart. Tile templates for larger tiles can present more information than tile templates for smaller tiles. As described above, the system may scale down the organizational chart so that it fits within the useable area of the browser window.

FIG. 7a illustrates a large tile template according to one embodiment. Tile template 700a is configured to present various attributes of the node (or subnode). Tile template 700a includes a profile picture associated with the node, the name of the employee associated with the node, the title of the employee associated with the node, the number of employees who directly report to the employee associated with the node, and/or additional information on the employee associated with the node. More or fewer attributes can be presented in tile template 700a. In one embodiment, the additional information presented can be role based.

Thus, the information being presented in tile template 700a can depend on the party generating the organizational chart. For example if the organizational chart is being generated for a manager, the additional information for each node can include the salaries of the employees who directly report to the manager. In contrast if the organizational chart is being generated for a low level employee, the salaries of the employee's colleagues may not be presented as additional information. In another embodiment, the additional information presented can be context based. In other words, the additional information presented can depend on the node (or subnode) which the tile represents. For example, the system may not present an attribute on the number of direct reports for a tile that represents a low level employee without direct reports. As another example, the system may not present an attribute on the amount of time off which the employee has accrued if the employee being represented by the tile is not a full time employee. Thus, one or more attributes of the node (or subnode) can affect the context of the tile and thus affect what attributes will be presented in the tile. In some embodiments, one or more of the attributes presented can be selectable. Selecting the attribute can be interested by the system as input representative of a request to present the direct reports of the tile in the organizational chart. For example, the number of direct reports attribute can be selectable (i.e., actionable) where selecting the number of direct reports attribute is processed by the system as a request to present the direct reports of the tile in the organizational chart. To remove the direct reports from the organizational chart, the attribute can be selected a second time. For example selecting the number of direct reports attribute can cause the direct reports to be removed from the organizational chart.

FIG. 7b illustrates a medium tile template according to one embodiment. When the organizational chart is scaled down past a predefined threshold, the system may utilize tile template 700b instead of tile template 700a when presenting the organizational chart. By using a smaller tile template, the overall size of the organizational chart will be smaller. As shown here, tile template 700b includes a profile picture, a name, a title, and a number of direct reports. As described above, one or more of the attributes presented can be actionable where selecting the attribute can result in an expansion of the organizational chart to display the direct reports of the employee being represented by the tile.

FIG. 7c illustrates a small tile template according to one embodiment. As shown here, tile template 700c includes even fewer attributes than template 700b and thus is even smaller in size. When the scaling factor of the organizational chart falls below another threshold, then tile template 700c can be utilized in generating the organizational chart. In some embodiments, the minimum tile template size that can be applied to an organizational chart can depend on the screen resolution and the size of the screen on the client device that is presenting the organizational chart. For example, it may be undesirable to apply the small tile template on a small screen with high resolution since the actual size of the tiles may be too small for a user to read. The system can implement a conditional check which determines the actual pixel size based on the screen resolution and the size of the screen. The pixel size can then be combined with the size of the tile to calculate the actual size of the tile. If the actual size of the tile is smaller than a predefined threshold, then the system may determine that the tile template is too small for presentation on the client's device and automatically move up to a larger tile template that satisfies the predefined threshold.

FIGS. 8a, 8b, and 8c illustrate exemplary tile templates according to one embodiment. These tile templates can be applied to present tiles in matrixes of the organizational chart. As shown, tile templates for tiles in a matrix can be smaller than the tile templates for tiles not part of a matrix (e.g., tile templates 700a, 700b, and 700c). FIG. 8a illustrates a large tile template according to one embodiment. Tile template 800a includes a profile picture, name, title, number of direct reports, and additional information. FIG. 8b illustrates a medium tile template according to one embodiment. Tile template 800b includes a name, title, and number of direct reports. FIG. 8c illustrates a small tile template according to one embodiment. Tile template 800c includes a name and title. As described above, one or more of these attributes can be actionable. Furthermore, the attributes presented in a given tile template can be context-based or role-based. In some embodiments, the system dynamically adjust the layout of the organizational chart when the organizational chart does not fit within the browser window by using a two-step process. In the first step, the system can adjust the layout and spacing of different tiles in the organizational chart to try and fit the organizational chart within the usable area of a browser window. If adjusting the layout and spacing does not resolve the issue, the system can further adjust the scaling of the organizational chart. The system can go repeat these steps until the organizational chart fits within the browser window.

Alternative People Charting

In some embodiments, the system can be configured to generate and display alternative types of charts besides the traditional organizational chart. For example, the system can generate different organizational views (i.e., other types of charts) based off of the organizational chart. The different organizational views can group employees within the organization based on different dimensions besides the organizational structure. For instance, the different dimensions can include the projects that the employees are working on, the location of the employees (e.g., which office the employee works in), the pay level of the employee, the performance of the employee, and other metrics or attributes that are associated with the employee. The organizational view can be presented to the user in a browser window of a graphical user interface.

Figure 9A:
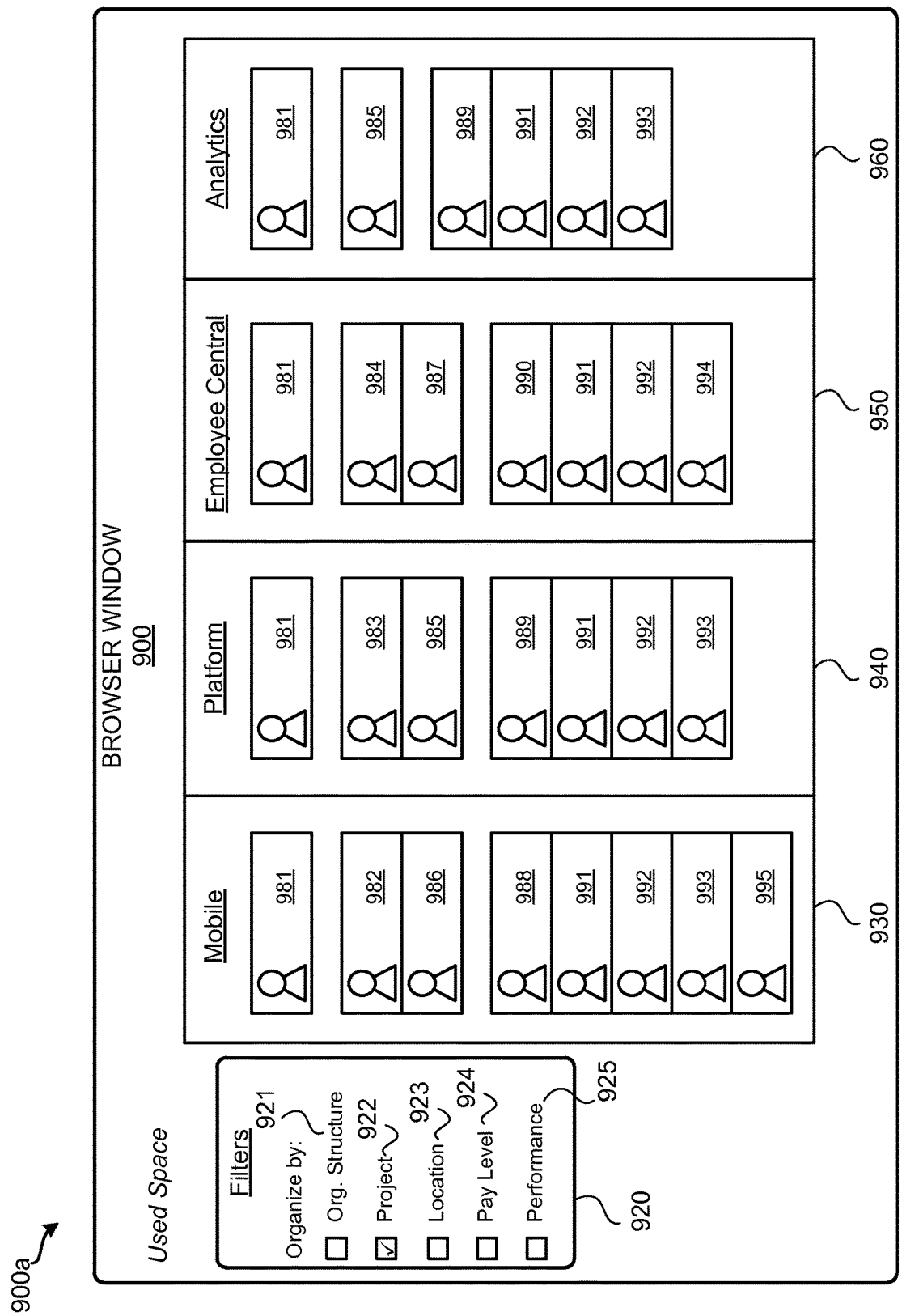
FIG. 9a illustrates an organizational view presented within a browser window according to one embodiment.

FIG. 9a illustrates an organizational view presented within a browser window according to one embodiment. The system can generate browser window 900 to provide a graphical user interface in which the user can display an organizational view of an organizational chart. As described above, the organizational chart can include a plurality of nodes which each represent an employee within the organization. Each node can store various metrics or attributes associated with the employee. For example, the employee's hierarchical level within the organization chart, the projects that the employee is working on, the location of the employee, the pay level of the employee, and the performance of the employee can be stored within the node. In other examples, the node can include pointers which allow the metrics and attributes to be retrieved from other data sources. The system can generate an organizational view based on one or more of these metrics and attributes.

Browser window 900 includes filter menu 920 and an organizational view that includes columns 930, 940, 950, and 960. In one example, browser window 900 can be initially presented with filter menu 920 and without an organizational view. Alternatively, browser window 900 can be initially presented with filter menu 920 and an organizational view of the hierarchical organizational chart. Filter menu 920 includes a plurality of dimensions. Each dimension can be selectable through touch inputs detectable on the graphical user interface. In one embodiment, the system can generate an organizational view based on the selected dimensions and present the generated organizational view in browser window 900. Here, project dimension 922 has been selected on filter menu 920 while dimensions 921, 923, 924, and 925 remain unselected. In response to the selected dimension, the system can query the data sources for employees (or nodes) based on criteria specified by the selected dimensions (here, the project dimension). Thus, the system can group employees within the organization by based on the selected dimension or dimensions. Groups of one or more nodes can be returned from the query. Each group of nodes can then be presented within the organizational view. In one example, the organizational view can be a data table that has been divided into a plurality of sections. Each group of nodes (i.e., employees) can be assigned to a section and can thus be presented within the boundaries of the section. Here, the system can submit queries for employees within the organization and place them into one of four available projects, which are mobile, platform, employee central, and analytics. As shown, some employees can be assigned to more than one project (see node 981). Each group of employees can be presented within a column of the organizational view, which consists of column 930 (for mobile project), column 940 (for platform project), column 950 (for employee central project), and column 960 (for analytics project).

In one embodiment, the system can further cluster nodes within a group based on additional dimensions. For example, nodes having the same metric or attribute can be clustered together. Clustered nodes can be presented together within the section corresponding to the group of employees. For instance, clustered employees can be presented adjoining to one another. Here, column 930 of the organizational view is configured to present employees that are working on the mobile project. The employees in the mobile project are being represented by nodes 981, 982, 986, 988, 991, 991, 993, and 995. The system can group these employees based on their hierarchical level. Thus, the employee that is represented by node 981 is an employee on the first hierarchical level. Similarly, the employees that are represented by nodes 982 and 986 belong to a second hierarchical level. Lastly, the employees represented by nodes 988, 991, 992, 993, and 995 belong to a third hierarchical level. Nodes of employees of the same hierarchical level can be positioned adjacent to one another. This can cause clusters of nodes which share the same hierarchical level. Here, node 981 is alone, node 982 and 986 are clustered together, and nodes 988, 991, 992, 993, and 995 are clustered together. In one example, a secondary dimension can be predefined by default. For instance, clustering by hierarchical level can be applied by default unless another secondary dimension has been manually selected. In some examples, the cluster with the highest hierarchical level can be positioned towards the top of column 930 with clusters of lower hierarchical level being positioned sequentially below the cluster related to the highest hierarchical level. Advantages of this ordering is that the most senior employee is positioned towards the top of the section. Here, employee 981 is most senior employee and thus is positioned towards the top of column 930 while employees 988, 991, 992, 993 and 995 are the same hierarchical level within the organization and thus are clustered together towards the bottom of column 930.

In some embodiments, different tile templates can be used when presenting a node within the organizational view. In one example, the system can alter the tile template used to present a node depending on the number of nodes which are to be presented in the section and the size (e.g., resolution) of the section. For example, column 930 can be prefixed to a given size. The system can select a tile template based on the number of nodes that are to be displayed within column 930, the clustering of the nodes, and/or the hierarchy of the nodes. Once the tile template has been selected, the system can populate column 930 with nodes that are generated based on the tile template. In some examples, the same tile template can be applied to each section within the operational view. Thus, the system can select a tile template based on the analysis of each section. For example, a smaller tile template may be appropriate for a section having more nodes while a larger tile template may be appropriate for a section having fewer nodes. The system may select the smaller tile template to ensure that the nodes can fit within all the sections of the organizational view.

Figure 9B:
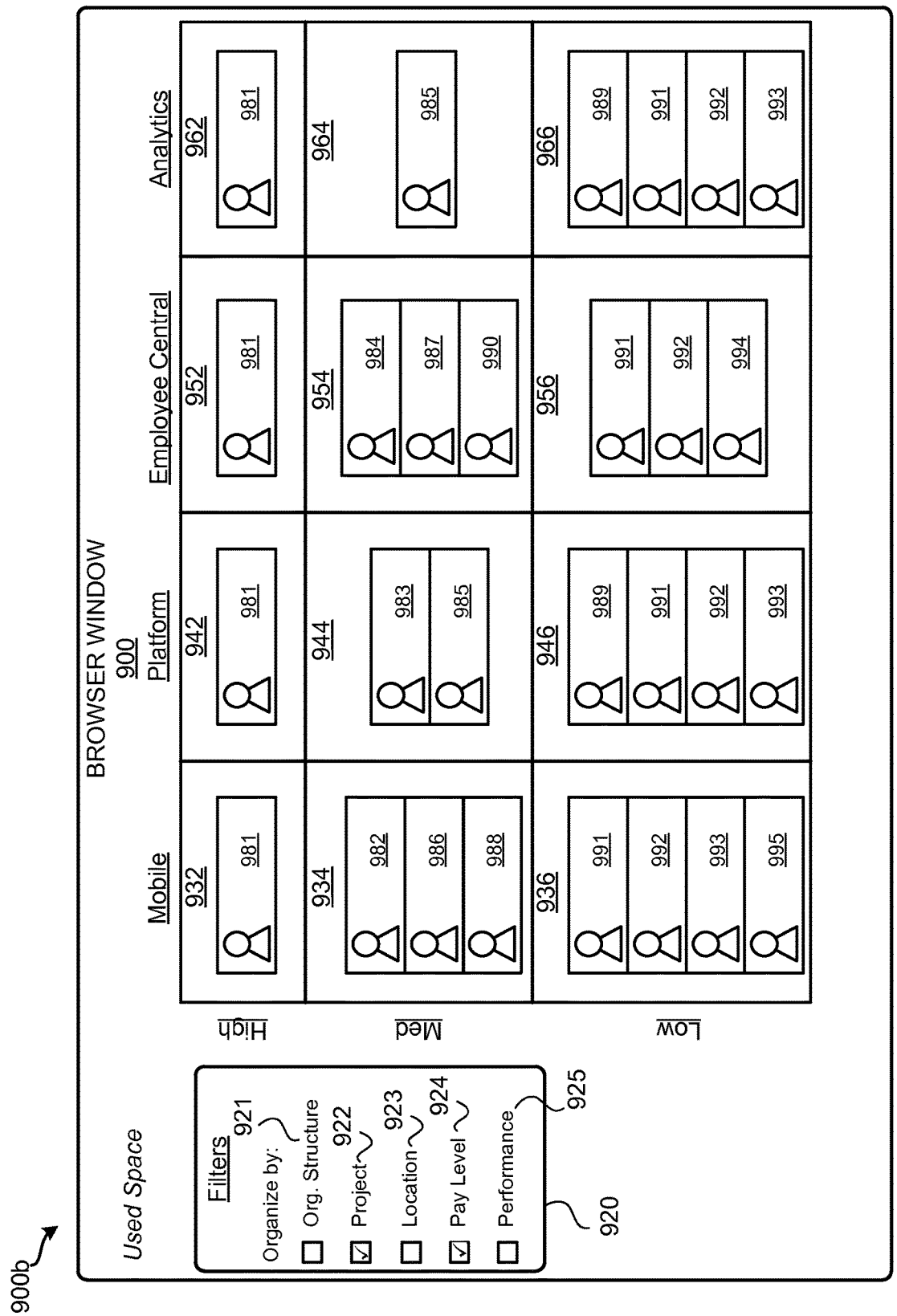
FIG. 9b illustrates an organizational view presented within a browser according to on embodiment.

FIG. 9b illustrates an organizational view presented within a browser according to on embodiment. FIG. 9b can be presented subsequently to FIG. 9a after another dimension is detected as being selected in filter menu 920. As shown, browser window 900 includes filter menu 920 where two dimensions have been selected (project dimension 922 and pay level dimension 924). Upon detecting that multiple dimensions have been selected, the system can generate an updated organizational view that is grouped based on the first and second selected dimension. The updated organizational view can replace the organizational view which was being presented when a single dimension was selected (e.g., the organizational view that includes columns 930, 940, 950, and 960 in FIG. 9a).

In one embodiment, the organizational view presented for two selected dimensions is a matrix table where the first dimension is presented along the x-axis and the second dimension is presented along the y-axis. Thus, each cell within the matrix table corresponds with a value for the first dimension and a value for the second dimension. Here, cell 932 is configured to present nodes of employees who are working in the mobile project and have a high pay level while cell 934 is configured to present nodes of employees who are also working in the mobile project but have a medium pay level. In some embodiments, the nodes within a cell can be clustered based on additional dimensions. In yet other embodiments, the tile template applied to the nodes within a cell can depend on the available space within the cell and the number of nodes within the cell. In some embodiments, the nodes within each cell can apply a different tile template. In other embodiments, the nodes within all the cells of the matrix table can apply the same tile template.

Figure 10:
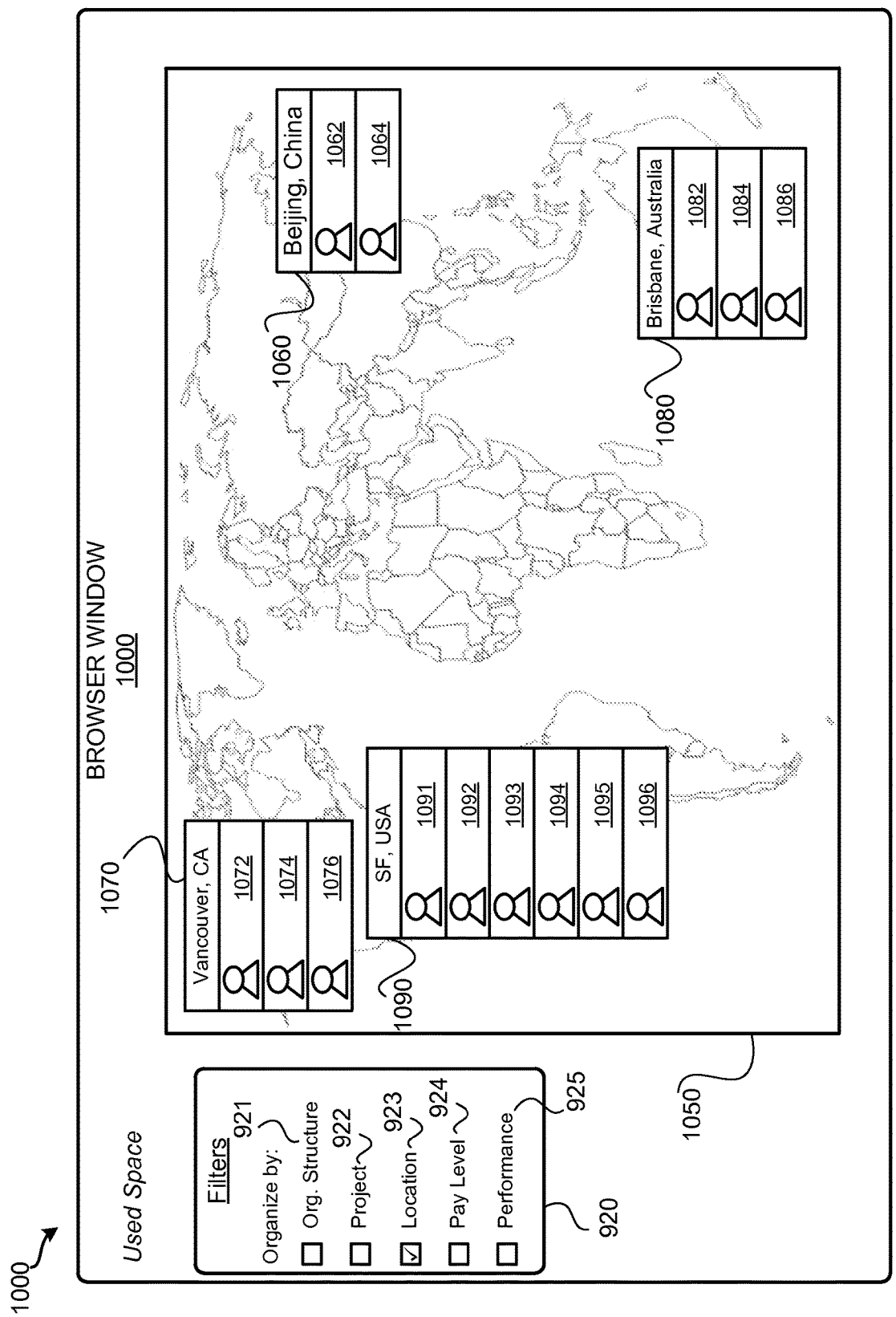
FIG. 10 illustrates an organizational view presented within a browser window according to another embodiment.

Besides matrix tables and data tables, the organizational view can also be a geographical map. FIG. 10 illustrates an organizational view presented within a browser window according to another embodiment. Here, location dimension 923 of filter menu 920 has been selected. In response to the selected dimension, the system can generate and present organizational view 1050 which is a geographical map. Organization view 1050 can include one or more tiles. Each tile can correspond to an employee. The position of a tile within organizational view 1050 can depend on a location attribute that is associated with the employee that the tile is representing. For example, the position of a tile within the organizational view 1050 can depend on the available space within organizational view 1050, the proximity of the location attribute to the same location on the geographical max, and also the other tiles being presented within organizational view 1050.

Here, tiles 1062 and 1064 represent employees who are working out of the Beijing, China office. As a result, tiles 1062 and 1064 are positioned in proximity of Beijing, China on the geographical map. In some examples, tiles 1062 and 1064 can include an office tile (tile 1060) to list the name of the office which the employees represented by tiles 1062 and 1064 work out of. Tiles 1060, 1062, and 1064 can be clustered together to imply that the employees represented by tiles 1062 and 1064 work out of the office location named in tile 1060. Advantages of this organizational view is that a user can quickly identify the work location of employees within the group or organization. Here, the employees are working out of four offices, the Beijing, China office (tile 1060), the Vancouver, Canada office (tile 1070), the Brisbane, Australia office (tile 1080), and the San Francisco, USA office (tile 1090). In some examples, all the employees within the organization can be charted in the geographical map. In other examples, a subset of the employees within the organization can be charted in the geographical map. The presentation of the employees within the organizational chart 1050 can depend on the available space and the number of nodes to be presented. Typically, the less available space and/or the more nodes that need to be plotted, the smaller the tile template.

Figure 11A:
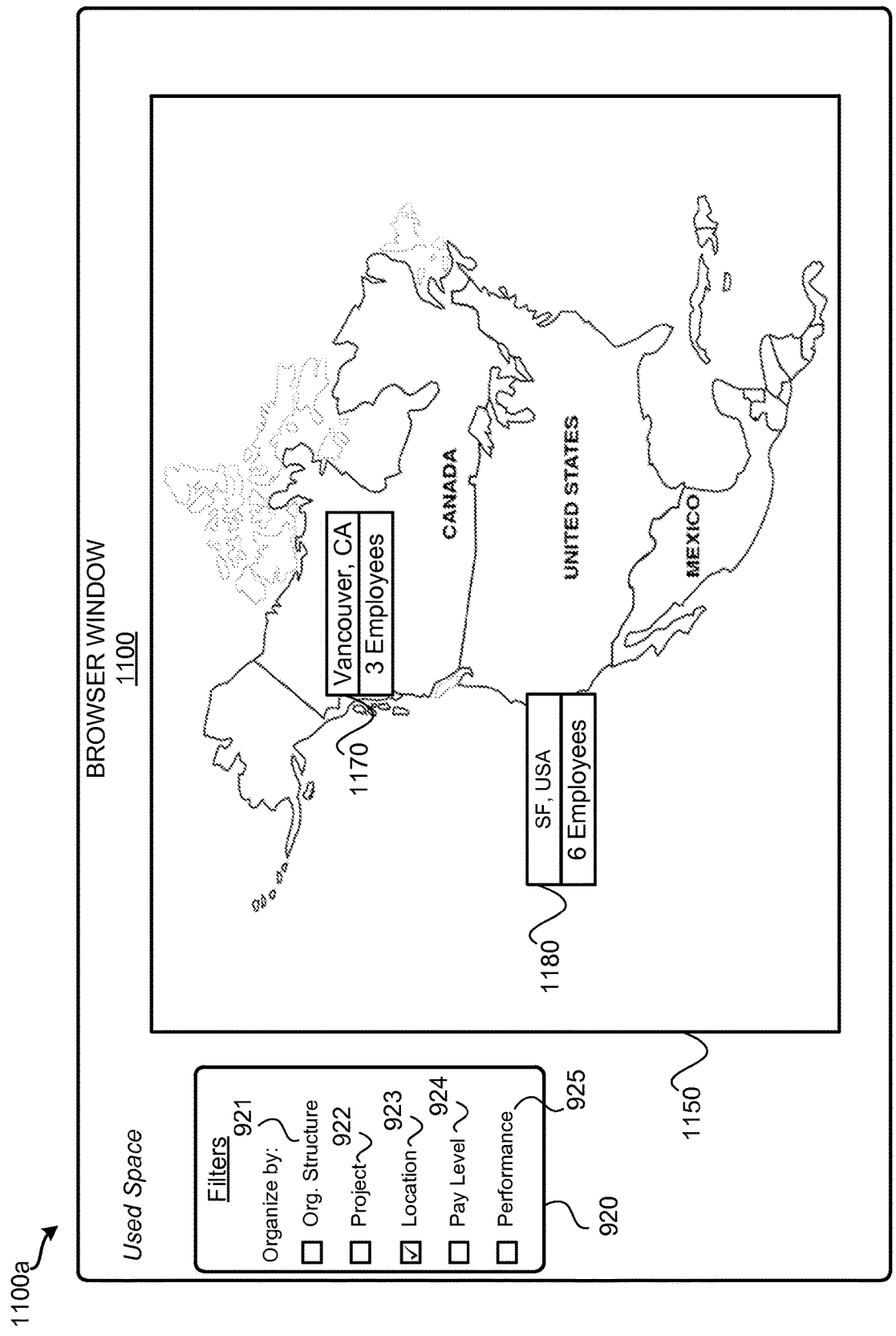
FIG. 11a illustrates an organizational view presented within a browser window according to another embodiment.

FIG. 11*a* illustrates an organizational view presented within a browser window according to another embodiment. Here, the system has generated organizational view 1150 by zooming in on the geographical map until the office locations containing employees within the organizational chart are presented within the organizational view 1150 while minimizing the open space. Advantages of zooming in on the geographical map is that geographical locations are enlarged, thus allowing the user to more accurately identify the geographical location which a tile is being associated with. As shown here, organizational view 1150 includes a geographical map that has been zoomed in such that office locations 1170 and 1180 are positioned more closely to their corresponding geographical location in organizational view 1150. Tile 1170 which represents the Vancouver location provides the name of the office (Vancouver, Calif.) and the number of employees that have been identified as working out of the office (3 employees). Similarly, tile 1180 which represents the San Francisco location provides the name of the office (SF, CA) and the number of employees that have been identified as working out of the office (6 employees). The number of employees identified as working out of the office can depend on the number of employees within the organizational chart that work out of the location. The organizational chart can depend on a node of interest (such as a manager within the organization). For example if a manager is selected as the node of interest, the system may present teams managed by the manager within organizational view 1150 but leave out employees who are not associated with the manager.

Figure 11B:
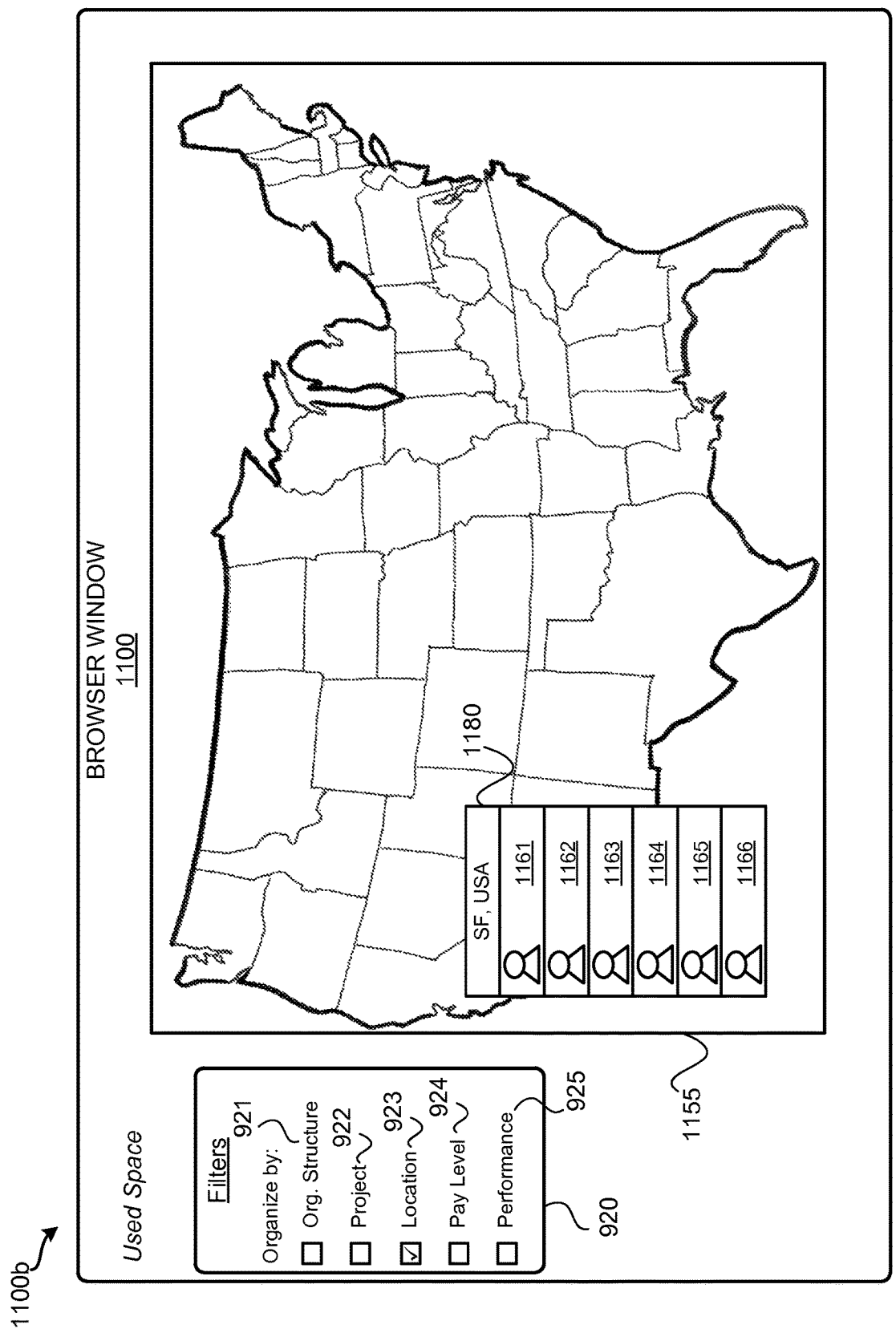
FIG. 11b illustrates an organizational view presented within a browser window according to another embodiment.

In one embodiment, the location tiles within organizational view 1150 (e.g., tiles 1160, 1170, and 1180) can be selectable. When the system detects that a location tile has been selected, the system can zoom in further in the geographical map and display the employees that work out of that location based on a location attribute of the employees. FIG. 11*b* illustrates an organizational view presented within a browser window according to another embodiment. The system can generate organizational view 1155 in response to detecting that location tile 1180 of FIG. 11*a* has been selected. As shown, organizational view 1155 is presenting a geographical map of the United States. In other examples, the system can zoom into other predefined amounts such as the state which the selected location tile is located in or the city which the selected location tile is located in rather than the country which the selected location tile is located in.

Here, the system has zoomed in the geographical map shown in organizational view 1155 so that location tile 1180 is within the boundaries of organizational view 1155 while location tiles 1160 and 1170 are outside the boundaries of organizational view 1155. Once zoomed in, the system can present additional tiles underneath location tile 1160. The additional tiles can be configured to represent the identified employees who work out of the location associated with location tile 1180. Here, tiles 1161-1166 can represent identified employees that work within the San Francisco location. The system can present additional details on an employee in response to detecting the selection of a tile. In some examples, the tile template used to generate tiles 1161-1166 can depend on the available space within organizational view 1155.

In some embodiments, each tile within the organizational view in FIGS. 9*a* to 11*b* can be selectable. When a tile is selected, the system can present additional details on the node that corresponds with the tile. For example, selecting tile 981 can result in the system presenting additional information on the employee corresponding to tile 981. The additional information can be presented in a pop-up window. In other examples, the system can be configured to allow for tiles within the organizational view to be selected and dragged into an employee pool (not shown. The employee pool can serve as a holding container for tiles. Once the user has placed one or more tiles in the employee pool, actions can be performed on the employee pool. For example, the employees that correspond with the tiles in the employee pool can be assigned to a project.

Figure 12:
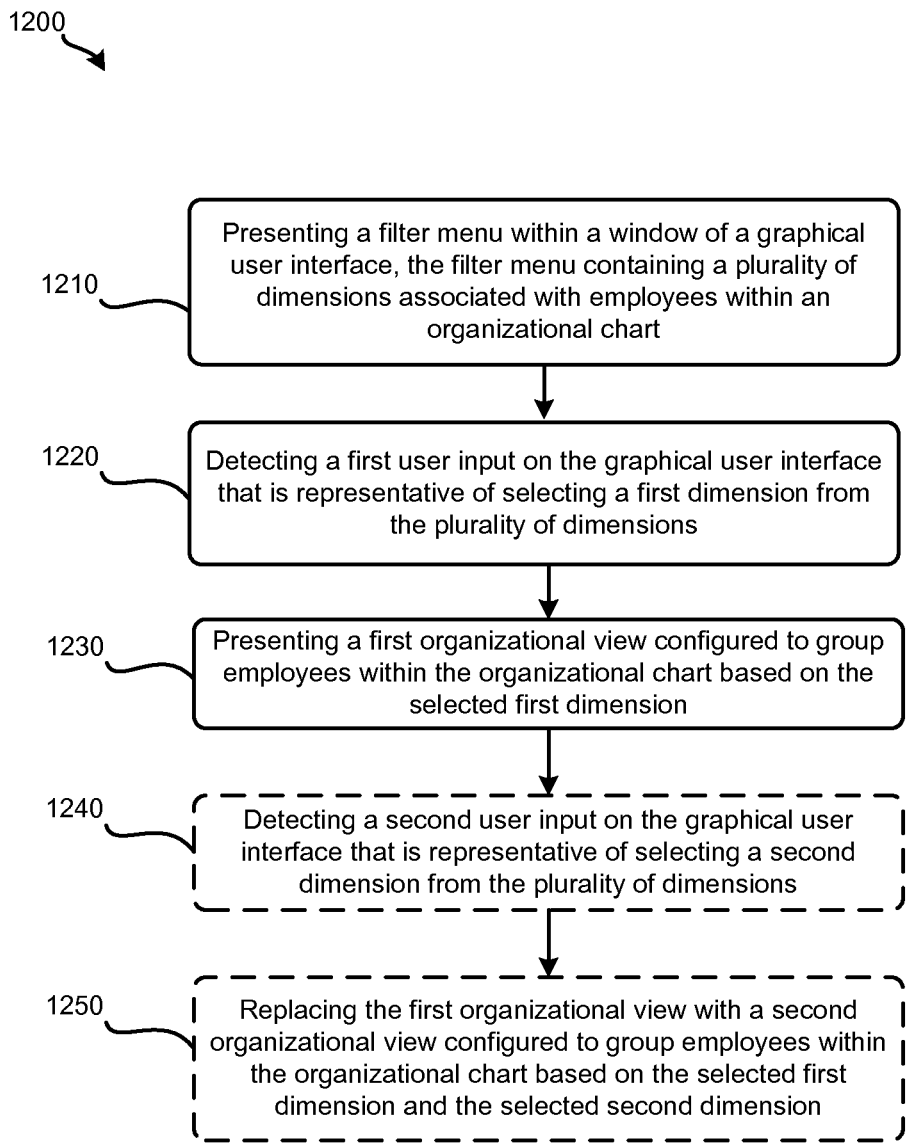
FIG. 12 illustrates a process for generating an organizational view according to one embodiment.

FIG. 12 illustrates a process for generating an organizational view according to one embodiment. Process 1200 can be stored in computer readable code and executed by a processor. For example, process 1200 can be part of the computer readable code that is executed by computer system 1310 of FIG. 13. Process 1200 can begin by presenting a filter menu within a window of a graphical user interface at step 1210. The filter menu can contain a plurality of dimensions associated with employees within an organizational chart. For example, each dimension can be an attribute or metric of the employees. Process 1200 can continue by detecting a first user input on the graphical user interface that is representative of selecting a first dimension from the plurality of dimensions at step 1220. The first user input can be a touch event detected on the graphical user interface. The touch event can be detected on or near the dimension in the filter menu.

Process 1200 can then continue by presenting a first organizational view configured to group employees within the organizational chart based on the selected first dimension at step 1230. Presenting the first organizational view can include generating the first organizational view by querying the nodes within the organizational chart to group nodes based on the first dimension. For example if the first dimension is project, then the nodes within the organizational chart can be grouped according to the project attribute belonging to each node. Once groups of nodes have been formed based on the first dimension, the system can generate the organizational view by creating a data table where each group of nodes is presented in a section of the data table. An exemplary first organizational view is the organizational view that consists of columns 930, 940, 950, and 960 in FIG. 9*a*.

After presenting the first organizational chart, process 1200 can optionally continue by detecting a second user input on the graphical user interface that is representative of selecting a second dimension from the plurality of dimensions at step 1240. When multiple dimensions are selected, the system can group the nodes within the organizational chart based on the selected dimensions. The groups of nodes can then be presented in an updated organizational view which has a section for each combination of the selected dimensions. Process 1200 can replace the first organizational view with a second organizational view configured to group employees within the organizational chart based on the selected first dimension and second dimension at step 1250. In some examples, the second organizational view can be a matrix table where each cell in the table presents a group of nodes having the same first dimension and second dimension. An exemplary second organizational view is the organization view that consists of cells 932, 934, 936, 942, 944, 946, 952, 954, 956, 962, 964, and 966 in FIG. 9*b*.

Figure 13:
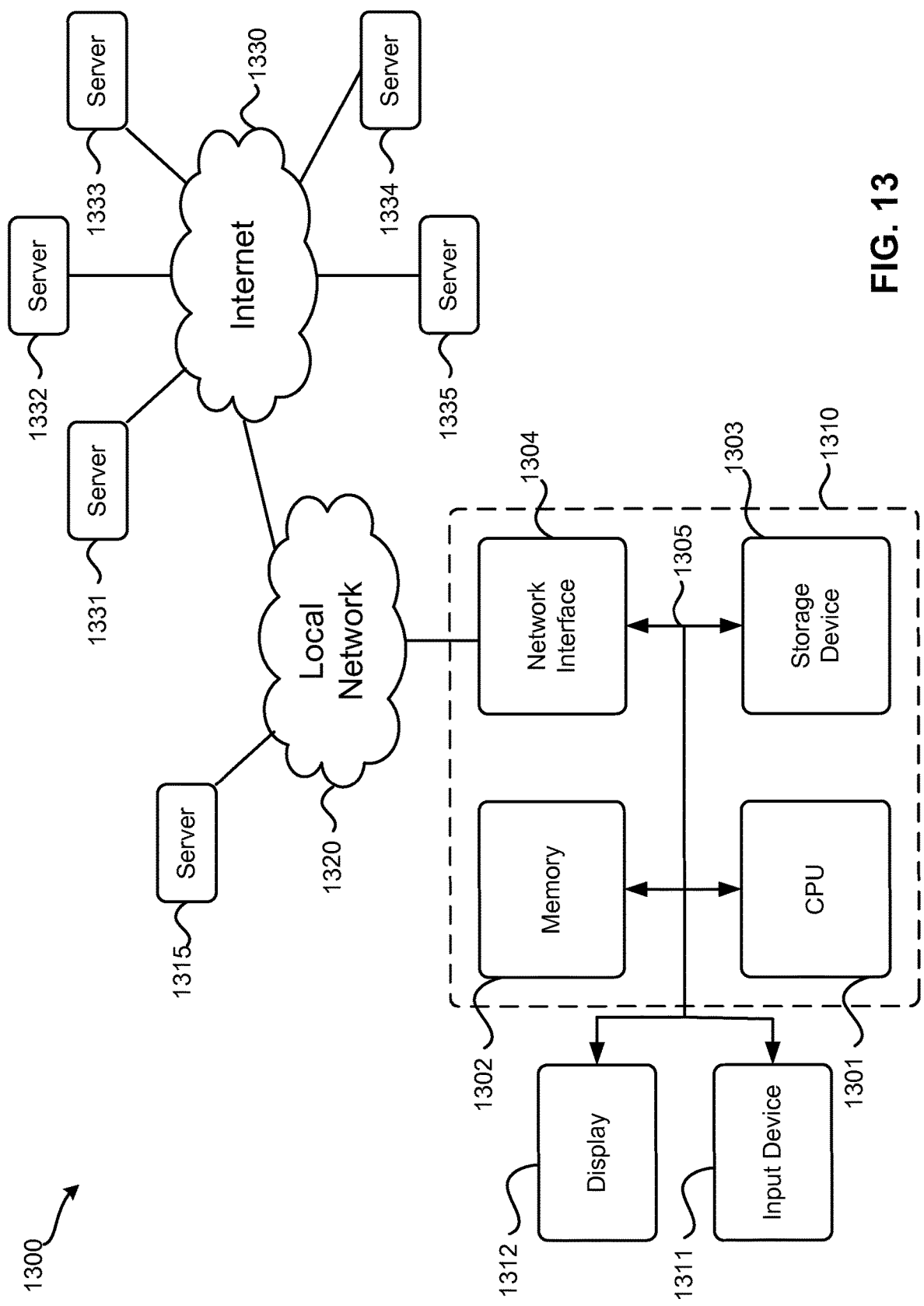
FIG. 13 illustrates an exemplary computer system according to one embodiment.

An exemplary computer system 1300 is illustrated in FIG. 13. Computer system 1310 includes a bus 1305 or other communication mechanism for communicating information, and a processor 1301 coupled with bus 1305 for processing information. Computer system 1310 also includes memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   presenting, by a processor, a filter menu and an organizational chart within a window of a graphical user interface, the organizational chart comprising a plurality of nodes organized in a hierarchical manner based on a hierarchy of employees in an organization, each node in the plurality of nodes representing an employee in the organization and storing a plurality of values for a plurality of attributes associated with the employee, the filter menu containing the plurality of attributes associated with the employees within the organizational chart;
   detecting, by the processor, a first user input on the graphical user interface that is representative of selecting a first attribute from the plurality of attributes;
   in response to the detection of the first user input, grouping employees within the organizational chart into a first set of employees and a second set of employees by querying the plurality of nodes of the organizational chart based on the selected first attribute, wherein each employee in the first set of employees has a same first value for the selected first attribute, wherein each employee in the second set of employees has a same second value for the selected first attribute, wherein the first value and the second value for the selected first attribute are different;
   determining, by the processor, a number of employees in the first set of employees;
   determining, by the processor, a number of employees in the second set of employees;
   determining, by the processor, a first tile template associated with a first tile having a first size for a first set of tiles based on the number of employees in the first set of employees, wherein each tile in the first set of tiles represents an employee in the first set of employees;

determining, by the processor, a second tile template associated with a second tile having a second, different size for a second set of tiles based on the number of employees in the second set of employees, wherein each tile in the second set of tiles represents an employee in the second set of employees, wherein the first size is larger than the second, different size when the number of employees in the first set of employees is less than the number of employees in the second set of employees, wherein the first size is smaller than the second, different size when the number of employees in the first set of employees is greater than the number of employees in the second set of employees;

generating, by the processor, the first set of tiles representing the first set of employees based on the determined first tile template, wherein each tile in the first set of tiles has a size equal to the first size of the first tile;

generating, by the processor, the second set of tiles representing the second set of employees based on the determined second tile template, wherein each tile in the second set of tiles has a size equal to the second, different size of the second tile;

generating, by the processor, a first organizational view of the organizational chart comprising the first set of tiles representing the first set of employees and the second set of tiles representing the second sets of employees; and replacing, by the processor, the organizational chart with the first organizational view of the organizational chart.

2. The computer-implemented method of claim 1, wherein the first organizational view is further configured as a data table divided into a plurality of sections, wherein a first section of the plurality of sections is associated with the first value for the selected first attribute and is configured to present the first set of tiles representing the first set of employees, wherein a second section of the plurality of sections is associated with the second value for the selected first attribute and is configured to present the second set of tiles representing the second set of employees.

3. The computer-implemented method of claim 2, wherein the first set of tiles representing the first set of employees are presented as a first set of clusters of tiles within the first section, wherein a first cluster of tiles from the first set of clusters of tiles contains employees from the first set of employees that reside within a first hierarchical level of the organizational chart, wherein a second cluster of tiles from the first set of clusters of tiles contains employees from the first set of employees that reside within a second hierarchical level of the organizational chart different from the first hierarchical level of the organizational chart, wherein the second set of tiles representing the second set of employees are presented as a second set of clusters of tiles within the second section, wherein a first cluster of tiles from the second set of clusters of tiles contains employees from the second set of employees that reside within a third hierarchical level of the organizational chart, wherein a second cluster of tiles from the second set of clusters of tiles contains employees from the second set of employees that reside within a fourth hierarchical level of the organizational chart different from the third hierarchical level of the organizational chart.

4. The computer-implemented method of claim 1 further comprising:

detecting, by the processor, a second user input on the graphical user interface that is representative of selecting a second attribute from the plurality of attributes;

in response to the detection of the second user input, grouping employees within the organizational chart into a third set of employees and a fourth set of employees, wherein each employee in the third set of employees has the same first value for the selected first attribute and a same first value for the selected second attribute, wherein each employee in the fourth set of employees has the same second value for the selected first attribute and a same second value for the selected second attribute, wherein the first value and the second value for the select second attribute are different; and replacing, by the processor, the first organizational view with a second organizational view of the organizational chart comprising the third and fourth sets of employees.

5. The computer-implemented method of claim 4, wherein the second organizational view is further configured as a matrix table divided into a plurality of sections, wherein a first section of the plurality of sections is associated with the first value for the selected first attribute and the first value for the selected second attribute and is configured to present a third set of tiles representing employees in the third set of employees having the first value for the selected first attribute and the first value for the selected second attribute, wherein a second section of the plurality of sections is associated with the second value for the selected first attribute and the first value for the selected second attribute and is configured to present a fourth set of tiles representing employees in the third set of employees having the second value for the selected first attribute and the first value for the selected second attribute, wherein a third section of the plurality of sections is associated with the first value for the selected first and the second value for the selected second attribute and is configured to present a fifth set of tiles representing employees in the fourth set of employees having the first value for the selected first attribute and the second value for the selected second attribute, wherein a fourth section of the plurality of sections is associated with the second value for the selected first attribute and the second value for the selected second attribute and is configured to present a sixth set of tiles representing employees in the fourth set of employees having the second value for the selected first attribute and the second value for the selected second attribute.

6. The computer-implemented method of claim 1, wherein the first organizational view is a geographical map, wherein the selected first attribute is a location attribute, wherein the method further comprises presenting, by the processor, the first organizational view comprising a first single tile representing the first set of employees instead of the first set of tiles and a second single tile representing the second set of employees instead of the second set of tiles.

7. The computer-implemented method of claim 6 further comprising:

detecting, by the processor, a second user input on the graphical user interface that is representative of zooming into the geographical map; and in response to the second user input, presenting, by the processor, the first set of tiles instead of the first single tile and the second set of tiles instead of the second single tile.

8. A non-transitory computer readable storage medium storing one or more programs, the one or more programs comprising instructions for:

presenting a filter menu and an organizational chart within a window of a graphical user interface, the organizational chart comprising a plurality of nodes organized in a hierarchical manner based on a hierarchy of employees in an organization, each node in the plurality of nodes representing an employee in the organization and storing a plurality of values for a plurality of attributes associated with the employee, the filter menu containing the plurality of attributes associated with the employees within the organizational chart;

detecting a first user input on the graphical user interface that is representative of selecting a first attribute from the plurality of attributes;

in response to the detection of the first user input, grouping employees within the organizational chart into a first set of employees and a second set of employees by querying the plurality of nodes of the organizational chart based on the selected first attribute, wherein each employee in the first set of employees has a same first value for the selected first attribute, wherein each employee in the second set of employees has a same second value for the selected first attribute, wherein the first value and the second value for the selected first attribute are different;

determining a number of employees in the first set of employees;

determining a number of employees in the second set of employees;

determining a first tile template associated with a first tile having a first size for a first set of tiles based on the number of employees in the first set of employees, wherein each tile in the first set of tiles represents an employee in the first set of employees;

determining a second tile template associated with a second tile having a second, different size for a second set of tiles based on the number of employees in the second set of employees, wherein each tile in the second set of tiles represents an employee in the second set of employees, wherein the first size is larger than the second, different size when the number of employees in the first set of employees is less than the number of employees in the second set of employees, wherein the first size is smaller than the second, different size when the number of employees in the first set of employees is greater than the number of employees in the second set of employees;

generating, by the processor, the first set of tiles representing the first set of employees based on the determined first tile template, wherein each tile in the first set of tiles has a size equal to the first size of the first tile;

generating, by the processor, the second set of tiles representing the second set of employees based on the determined second tile template, wherein each tile in the second set of tiles has a size equal to the second, different size of the second tile;

generating a first organizational view of the organizational chart comprising the first set of tiles representing the first set of employees and the second set of tiles representing the second sets of employees; and replacing, by the processor, the organizational chart with the first organizational view of the organizational chart.

9. The non-transitory computer readable storage medium of claim 8, wherein the first organizational view is further configured as a data table divided into a plurality of sections, wherein a first section of the plurality of sections is associated with the first value for the selected first attribute and is configured to present the first set of tiles representing the first set of employees, wherein a second section of the plurality of sections is associated with the second value for the selected first attribute and is configured to present the second set of tiles representing the second set of employees.

10. The non-transitory computer readable storage medium of claim 9, wherein the first set of tiles representing the first set of employees are presented as a first set of clusters of tiles within the first section, wherein a first cluster of tiles from the first set of clusters of tiles contains employees from the first set of employees that reside within a first hierarchical level of the organizational chart, wherein a second cluster of tiles from the first set of clusters of tiles contains employees from the first set of employees that reside within a second hierarchical level of the organizational chart different from the first hierarchical level of the organizational chart, wherein the second set of tiles representing the second set of employees are presented as a second set of clusters of tiles within the second section, wherein a first cluster of tiles from the second set of clusters of tiles contains employees from the second set of employees that reside within a third hierarchical level of the organizational chart, wherein a second cluster of tiles from the second set of clusters of tiles contains employees from the second set of employees that reside within a fourth hierarchical level of the organizational chart different from the third hierarchical level of the organizational chart.

11. The non-transitory computer readable storage medium of claim 8, the one or more programs further comprising instructions for:

detecting a second user input on the graphical user interface that is representative of selecting a second attribute from the plurality of attributes;

in response to the detection of the second user input, grouping employees within the organizational chart into a third set of employees and a fourth set of employees, wherein each employee in the third set of employees has the same first value for the selected first attribute and a same first value for the selected second attribute, wherein each employee in the fourth set of employees has the same second value for the selected first attribute and a same second value for the selected second attribute, wherein the first value and the second value for the select second attribute are different; and replacing the first organizational view with a second organizational view of the organizational chart comprising the third and fourth sets of employees.

12. The non-transitory computer readable storage medium of claim 11, wherein the second organizational view is further configured as a matrix table divided into a plurality of sections, wherein a first section of the plurality of sections is associated with the first value for the selected first attribute and the first value for the selected second attribute and is configured to present a third set of tiles representing employees in the third set of employees having the first value for the selected first attribute and the first value for the selected second attribute, wherein a second section of the plurality of sections is associated with the second value for the selected first attribute and the first value for the selected second attribute and is configured to present a fourth set of tiles representing employees in the third set of employees having the second value for the selected first attribute and the first value for the selected second attribute, wherein a third section of the plurality of sections is associated with the first value for the selected first attribute and the second value for the selected second attribute and is configured to present a fifth set of tiles representing employees in the fourth set of employees having the first value for the selected first attribute and the second value for the selected second attribute, wherein a fourth section of the plurality of sections is associated with the second value for the selected first attribute and the second value for the selected second attribute and is configured to present a sixth set of tiles representing employees in the fourth set of employees having the second value for the selected first attribute and the second value for the selected second attribute.

13. The non-transitory computer readable storage medium of claim 8, wherein the first organizational view is a geographical map, wherein the selected first attribute is a location attribute, the one or more programs further comprising instructions for presenting the first organizational view comprising a first single tile representing the first set of employees instead of the first set of tiles and a second single tile representing the second set of employees instead of the second set of tiles.

14. The non-transitory computer readable storage medium of claim 13, the one or more programs further comprising instructions for:
   detecting a second user input on the graphical user interface that is representative of zooming into the geographical map; and
   in response to the second user input, presenting the first set of tiles instead of the first single tile and the second set of tiles instead of the second single tile.

15. A computer implemented system, comprising:
   one or more computer processors; and
   a non-transitory computer-readable storage medium comprising instructions, that when executed, control the one or more computer processors to be configured for:
   presenting a filter menu and an organizational chart within a window of a graphical user interface, the organizational chart comprising a plurality of nodes organized in a hierarchical manner based on a hierarchy of employees in an organization, each node in the plurality of nodes representing an employee in the organization and storing a plurality of values for a plurality of attributes associated with the employee, the filter menu containing the plurality of attributes associated with the employees within the organizational chart;
   detecting a first user input on the graphical user interface that is representative of selecting a first attribute from the plurality of attributes;
   in response to the detection of the first user input, grouping employees within the organizational chart into a first set of employees and a second set of employees by querying the plurality of nodes of the organizational chart based on the selected first attribute, wherein each employee in the first set of employees has a same first value for the selected first attribute, wherein each employee in the second set of employees has a same second value for the selected first attribute, wherein the first value and the second value for the selected first attribute are different;
   determining a number of employees in the first set of employees;
   determining a number of employees in the second set of employees;
   determining a first tile template associated with a first tile having a first size for a first set of tiles based on the number of employees in the first set of employees, wherein each tile in the first set of tiles represents an employee in the first set of employees;
   determining a second tile template associated with a second tile having a second, different size for a second set of tiles based on the number of employees in the second set of employees, wherein each tile in the second set of tiles represents an employee in the second set of employees, wherein the first size is larger than the second, different size when the number of employees in the first set of employees is less than the number of employees in the second set of employees, wherein the first size is smaller than the second, different size when the number of employees in the first set of employees is greater than the number of employees in the second set of employees;
   generating, by the processor, the first set of tiles representing the first set of employees based on the determined first tile template, wherein each tile in the first set of tiles has a size equal to the first size of the first tile;
   generating, by the processor, the second set of tiles representing the second set of employees based on the determined second tile template, wherein each tile in the second set of tiles has a size equal to the second, different size of the second tile;
   generating a first organizational view of the organizational chart comprising the first set of tiles representing the first set of employees and the second set of tiles representing the second sets of employees; and
   replacing, by the processor, the organizational chart with the first organizational view of the organizational chart.

16. The computer implemented system of claim 15, wherein the first organizational view is further configured as a data table divided into a plurality of sections, wherein a first section of the plurality of sections is associated with the first value for the selected first attribute and is configured to present the first set of tiles representing the first set of employees, wherein a second section of the plurality of sections is associated with the second value for the selected first attribute and is configured to present the second set of tiles representing the second set of employees.

17. The computer implemented system of claim 16, wherein the first set of tiles representing the first set of employees are presented as a first set of clusters of tiles within the first section, wherein a first cluster of tiles from the first set of clusters of tiles contains employees from the first set of employees that reside within a first hierarchical level of the organizational chart, wherein a second cluster of tiles from the first set of clusters of tiles contains employees from the first set of employees that reside within a second hierarchical level of the organizational chart different from the first hierarchical level of the organizational chart, wherein the second set of tiles representing the second set of employees are presented as a second set of clusters of tiles within the second section, wherein a first cluster of tiles from the second set of clusters of tiles contains employees from the second set of employees that reside within a third hierarchical level of the organizational chart, wherein a second cluster of tiles from the second set of clusters of tiles contains employees from the second set of employees that reside within a fourth hierarchical level of the organizational chart different from the third hierarchical level of the organizational chart.

18. The computer implemented system of claim 15, the instructions further control the one or more computer processors to be configured for:
   detecting a second user input on the graphical user interface that is representative of selecting a second attribute from the plurality of attributes;
   in response to the detection of the second user input, grouping employees within the organizational chart into a third set of employees and a fourth set of employees, wherein each employee in the third set of employees has the same first value for the selected first attribute and a same first value for the selected second attribute, wherein each employee in the fourth set of employees has the same second value for the selected first attribute and a same second value for the selected second attribute, wherein the first value and the second value for the select second attribute are different; and replacing the first organizational view with a second organizational view of the organizational chart comprising the third and fourth sets of employees.

19. The computer implemented system of claim 18, wherein the second organizational view is further configured as a matrix table divided into a plurality of sections, wherein a first section of the plurality of sections is associated with the first value for the selected first attribute and the first value for the selected second attribute and is configured to present a third set of tiles representing employees in the third set of employees having the first value for the selected first attribute and the first value for the selected second attribute, wherein a second section of the plurality of sections is associated with the second value for the selected first attribute and the first value for the selected second attribute and is configured to present a fourth set of tiles representing employees in the third set of employees having the second value for the selected first attribute and the first value for the selected second attribute, wherein a third section of the plurality of sections is associated with the first value for the selected first attribute and the second value for the selected second attribute and is configured to present a fifth set of tiles representing employees in the fourth set of employees having the first value for the selected first attribute and the second value for the selected second attribute, wherein a fourth section of the plurality of sections is associated with the second value for the selected first attribute and the second value for the selected second attribute and is configured to present a sixth set of tiles representing employees in the fourth set of employees having the second value for the selected first attribute and the second value for the selected second attribute.

20. The computer implemented system of claim 15, wherein the first organizational view is a geographical map, wherein the selected first attribute is a location attribute, wherein the instructions further control the one or more computer processors to be configured for presenting the first organizational view comprising a first single tile representing the first set of employees instead of the first set of tiles and a second single tile representing the second set of employees instead of the second set of tiles.

* * * * *